(12) United States Patent
Li et al.

(10) Patent No.: US 10,389,217 B2
(45) Date of Patent: Aug. 20, 2019

(54) FLUID GENERATING DEVICE AND ELECTRIC APPARATUS USING THE SAME

(71) Applicant: JOHNSON ELECTRIC INTERNATIONAL AG, Murten (CH)

(72) Inventors: Yue Li, Hong Kong (CN); Kwong Yip Poon, Hong Kong (CN); Chui You Zhou, Shenzhen (CN); Jie Chai, Shenzhen (CN); Wen Liang Li, Shenzhen (CN); Lin Ping Gui, Shenzhen (CN); Tao Zhang, Shenzhen (CN); Qiang Zhou, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 99 days.

(21) Appl. No.: 15/240,185

(22) Filed: Aug. 18, 2016

(65) Prior Publication Data

US 2017/0054352 A1 Feb. 23, 2017

(30) Foreign Application Priority Data

Aug. 18, 2015 (CN) .......................... 2015 1 0507014
Aug. 28, 2015 (CN) .......................... 2015 1 0545984
Nov. 3, 2015 (CN) .......................... 2015 1 0739830

(51) Int. Cl.
*H02K 19/04* (2006.01)
*H02K 29/03* (2006.01)
(Continued)

(52) U.S. Cl.
CPC ............. *H02K 19/04* (2013.01); *H02K 1/146* (2013.01); *H02K 1/2706* (2013.01); *H02K 3/18* (2013.01);
(Continued)

(58) Field of Classification Search
CPC ........ H02K 9/06; H02K 1/146; H02K 1/2706; H02K 19/04; H02K 3/18; H02K 29/03; H02K 21/16; H02K 2213/03; H02K 1/148
(Continued)

(56) References Cited

U.S. PATENT DOCUMENTS 3,802,066 A * 4/1974 Barrett ...................... H02K 1/16
29/596
6,940,205 B1 * 9/2005 Murakami ............. H02K 1/278
310/156.01
(Continued)

FOREIGN PATENT DOCUMENTS

CN 202026166 U 11/2011
CN 104124849 A 10/2014
(Continued)

*Primary Examiner* — Bernard Rojas
*Assistant Examiner* — Alexander A Singh
(74) *Attorney, Agent, or Firm* — Muncy, Geissler, Olds & Lowe, P.C.

(57) ABSTRACT

A fluid generating device and an electric apparatus utilizing the fluid generating device are provided. The fluid generating device includes a motor and an impeller driven by the motor. The motor is a single phase direct current brushless motor which includes a stator and a rotor. The stator includes a stator core and a stator winding. The stator core includes an outer ring portion, teeth extending inwardly from the outer ring portion, a pole shoe formed at the tooth. Slot openings are formed between the pole shoes. The rotor is received in a receiving chamber defined by the pole shoes. Inner surfaces of the pole shoes and the rotor form therebetween a substantially even air gap. The presence of even air gap can reduce the cogging torque of the motor, thus reducing the startup current and noise of the motor.

19 Claims, 23 Drawing Sheets

(51) Int. Cl.
  *H02K 3/18* (2006.01)
  *H02K 21/16* (2006.01)
  *H02K 1/14* (2006.01)
  *H02K 1/27* (2006.01)

(52) U.S. Cl.
  CPC ............ *H02K 29/03* (2013.01); *H02K 1/148* (2013.01); *H02K 21/16* (2013.01); *H02K 2213/03* (2013.01)

(58) Field of Classification Search
  USPC .................. 310/156.01, 156.46, 49.25, 49.26
  See application file for complete search history.

(56) References Cited

U.S. PATENT DOCUMENTS

| | | | | |
|---|---|---|---|---|
| 2002/0180295 | A1* | 12/2002 | Kaneda | H02K 1/278 310/156.43 |
| 2008/0024028 | A1* | 1/2008 | Islam | H02K 5/22 310/187 |
| 2008/0197794 | A1* | 8/2008 | Vermeir | H02P 6/085 318/400.06 |
| 2008/0303370 | A1* | 12/2008 | Rahman | H02K 1/165 310/179 |
| 2010/0119390 | A1* | 5/2010 | Baba | H02K 1/276 417/423.7 |
| 2015/0042194 | A1 | 2/2015 | Li et al. | |
| 2015/0061429 | A1* | 3/2015 | Sakai | H02K 9/06 310/63 |
| 2016/0294235 | A1* | 10/2016 | Takizawa | H02K 21/14 |

FOREIGN PATENT DOCUMENTS

| | | |
|---|---|---|
| CN | 104124849 A | 10/2014 |
| CN | 104348268 A | 2/2015 |
| EP | 1103202 A1 | 5/2001 |
| EP | 1942575 A2 | 7/2008 |

* cited by examiner

FLUID GENERATING DEVICE AND ELECTRIC APPARATUS USING THE SAME

CROSS REFERENCE TO RELATED APPLICATIONS

This non-provisional patent application claims priority under 35 U.S.C. § 119(a) from Patent Application No. 201510507014.7 filed in The People's Republic of China on Aug. 18, 2015, Patent Application No. 201510545984.6 filed in The People's Republic of China on Aug. 28, 2015, and Patent Application No. 201510739830.0 filed in The People's Republic of China on Nov. 3, 2015.

FIELD OF THE INVENTION

The present invention relates to motors, and in particular to a fluid generating device which can be used in vacuum cleaners, hand dryers, hair dryers, air blower, or the like.

BACKGROUND OF THE INVENTION

Existing fluid generating devices are usually powered by a three phase motor. The three phase motor has a higher cost than the single phase brushless motor. However, the single phase motor has the problem of startup failure due to dead point. In order to avoid the dead point, the air gap between the stator and rotor of the single phase brushless motor is usually an uneven gap. However, the motor with uneven air gap usually has an unduly large cogging torque and hence large noise.

The present invention aims to provide a fluid generating device which can overcome the above problems.

SUMMARY OF THE INVENTION

Thus, there is a desire for a fluid generating device with reduced cogging torque.

In one aspect, a fluid generating device is provided which includes a single phase motor comprising a stator comprising a stator core and a stator winding wound around the stator core, the stator core comprising a yoke, a plurality of teeth extending inwardly from the yoke, a pole face formed at a distal end of each of the teeth and extending along a circumferential direction of the motor; a rotor rotatable relative to the stator, the rotor being received in a receiving chamber surrounded by the pole faces, the rotor comprising a plurality of magnetic poles confronting the pole faces of the stator, outer surfaces of the magnetic poles of the rotor and the pole faces of the stator being coaxial with each other to thereby form there between a substantially even air gap; and an impeller being driven by the rotor to generate a fluid flow.

Preferably, the pole faces of adjacent teeth are separated by a slot opening, and the slot opening has a width less than or equal to fourth times of a thickness of the air gap.

Preferably, each tooth comprises a tooth body extending from the yoke and a pair of pole shoes extending respectively from a distal end of the tooth body in two opposite circumferential directions of the rotor.

Preferably, the pole shoe has a radial thickness gradually decreasing in a direction away from the tooth body.

Preferably, the pole shoes of adjacent teeth are separated from each other by a slot opening or connected together by a magnetic bridge, the slot opening or magnetic bridge is offset from a symmetrical center between the two adjacent teeth bodies.

Preferably, the pole shoes of adjacent teeth are separated from each other by a slot opening, the two pole shoes comprise a shorter pole shoe and a longer pole shoe, and the inner surface of the shorter pole shoe forms a chamfer adjacent the slot opening.

Preferably, the slot opening or magnetic bridge is offset from a symmetrical center of corresponding two adjacent teeth by an electric angle of 45 to 135 degrees.

Preferably, the stator core is formed by joining a plurality of stator core units along a circumferential direction of the stator, each of the stator core units comprises a tooth with its pole shoe, and a yoke segment connected to the tooth, and the yoke segments of the adjacent stator core units are connected together to form the yoke of the stator core.

Preferably, for each of the stator core units, one end of the tooth is connected to one end of the yoke segment or connected to the yoke segment between two ends of the yoke segment.

Preferably, the yoke is a ring yoke, and the teeth and the ring yoke are separately formed.

Preferably, the teeth includes a first tooth and a second tooth, the pole face of the first tooth forms a first arc surface with a first positioning groove defined therein, the pole face of the second tooth forms a second arc surface with a second positioning groove defined thereon, and the first arc surface and the second arc surface are opposed to each other with the receiving chamber formed there between.

Preferably, the first tooth and the second tooth form there between a first slot opening/magnetic bridge and a second slot opening/magnetic bridge at opposite sides of the rotor, and the first slot opening/magnetic bridge and the second slot opening/magnetic bridge are symmetrical about an axis of the rotor.

Preferably, an angle of 60 to 65 degrees is formed between a connecting line connecting a center of the first slot opening/magnetic bridge and a center of the rotor and an extension direction of the tooth body of the first tooth.

Preferably, two circumferential ends of the first arc surface respectively form a first cutting surface and a second cutting surface, two circumferential ends of the second arc surface respectively form a third cutting surface and a fourth cutting surface; the first cutting surface and the third cutting surface are opposed to each other and define the first slot opening there between, and the second cutting surface and the fourth cutting surface define the second slot opening there between, an acute angle being formed between the cutting surfaces and a center line of the tooth body of the first or second tooth.

Preferably, a line connecting the first positioning groove and the second positioning groove coincides with center lines of the tooth bodies of the first tooth and the second tooth.

Preferably, the single phase motor is a single phase permanent magnet direct current brushless motor.

In another aspect, the present invention provide an electric apparatus comprising the above described fluid generating device. The fluid generating device is preferably an air flow generating device. The electric apparatus may be a hand dryer, a hair dryer, a vacuum cleaner or an air blower and so on.

The fluid generating device of the present invention uses a single phase motor which has an even air gap and small slot opening/magnetic bridge, which can reduce the cogging torque of the motor and noise of the motor.

DETAILED DESCRIPTION OF THE PREFERRED EMBODIMENTS

Figure 1:
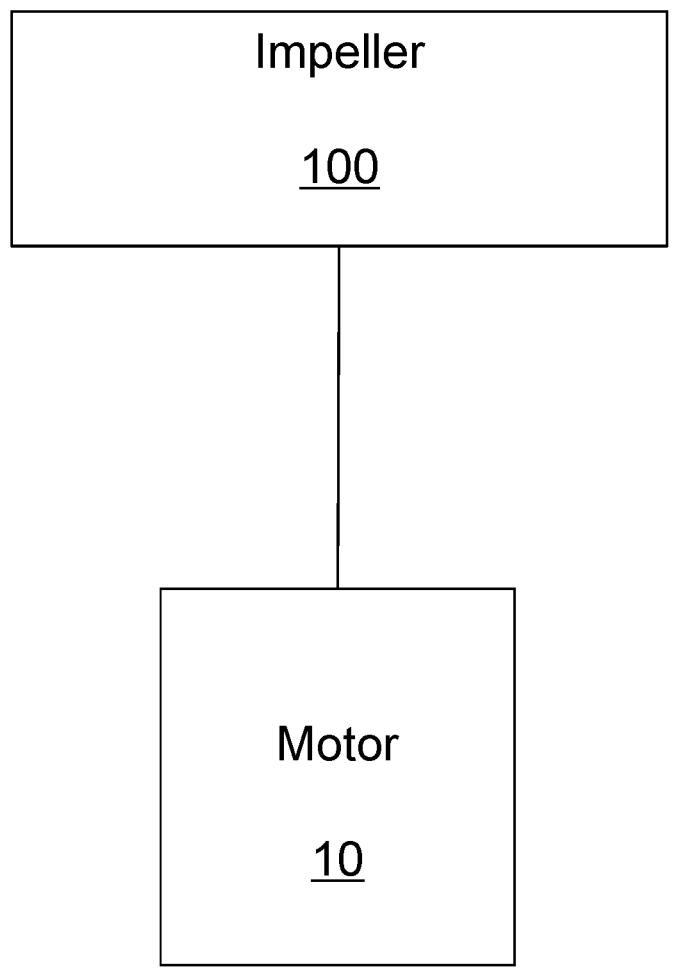
FIG. 1 is a simplified schematic view of a fluid generating device of the present invention.
Figure 2:
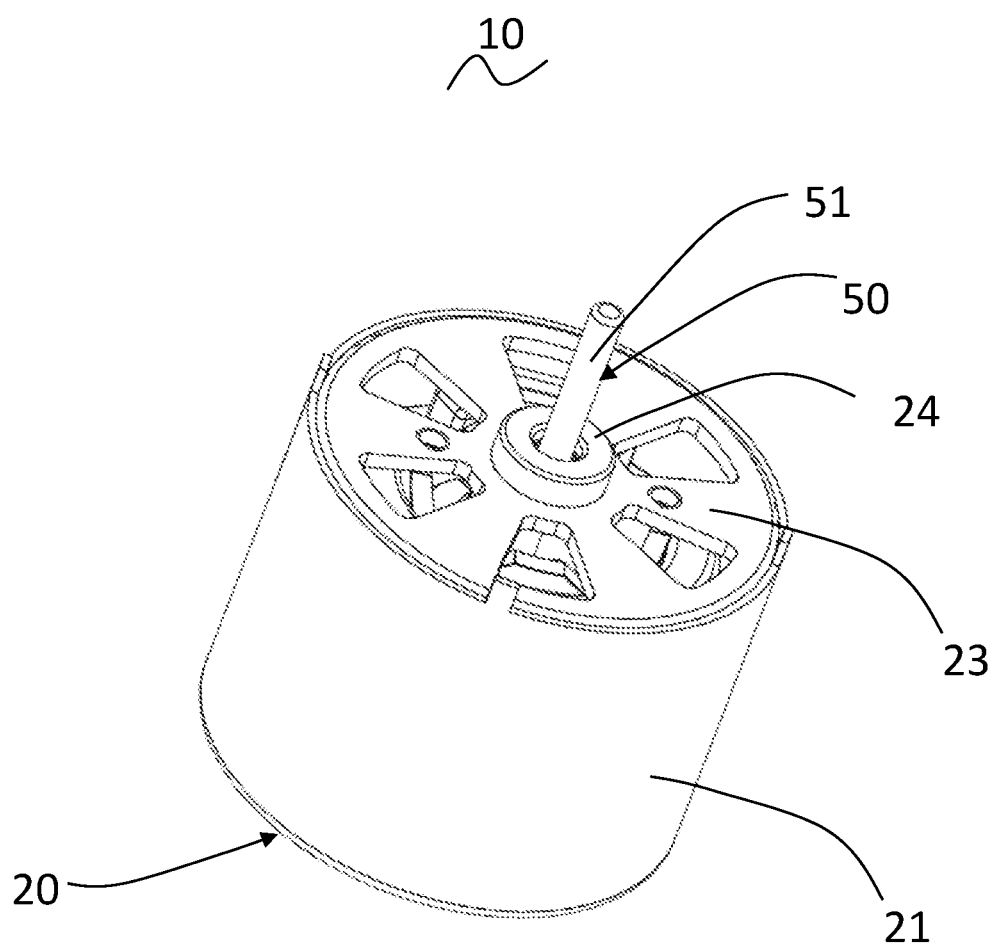
FIG. 2 illustrates a single phase brushless motor according to a preferred embodiment of the present invention.
Figure 3:
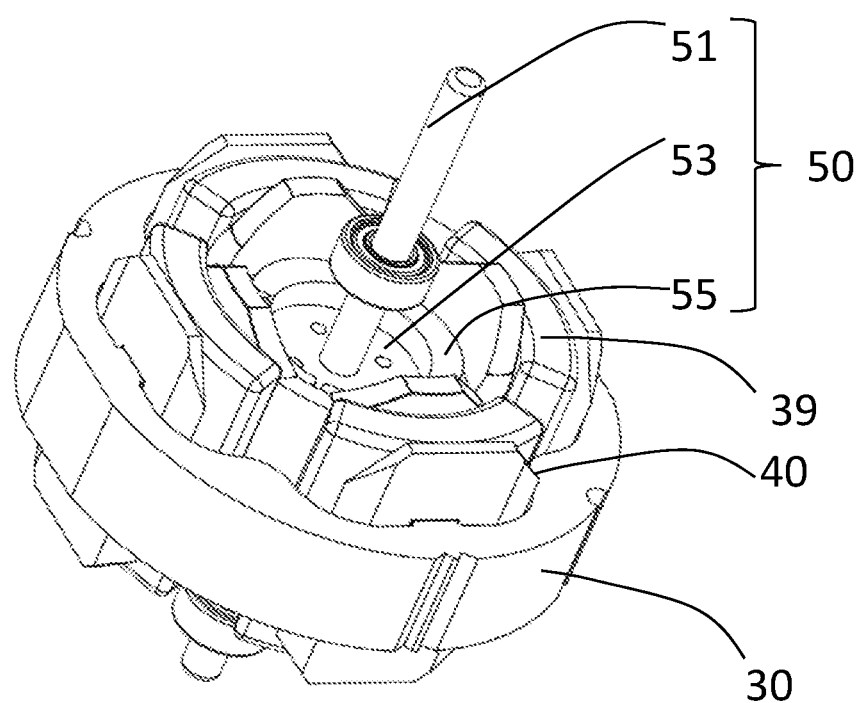
FIG. 3 illustrates the single phase brushless motor of FIG. 2, with the outer housing removed.
Figure 4:
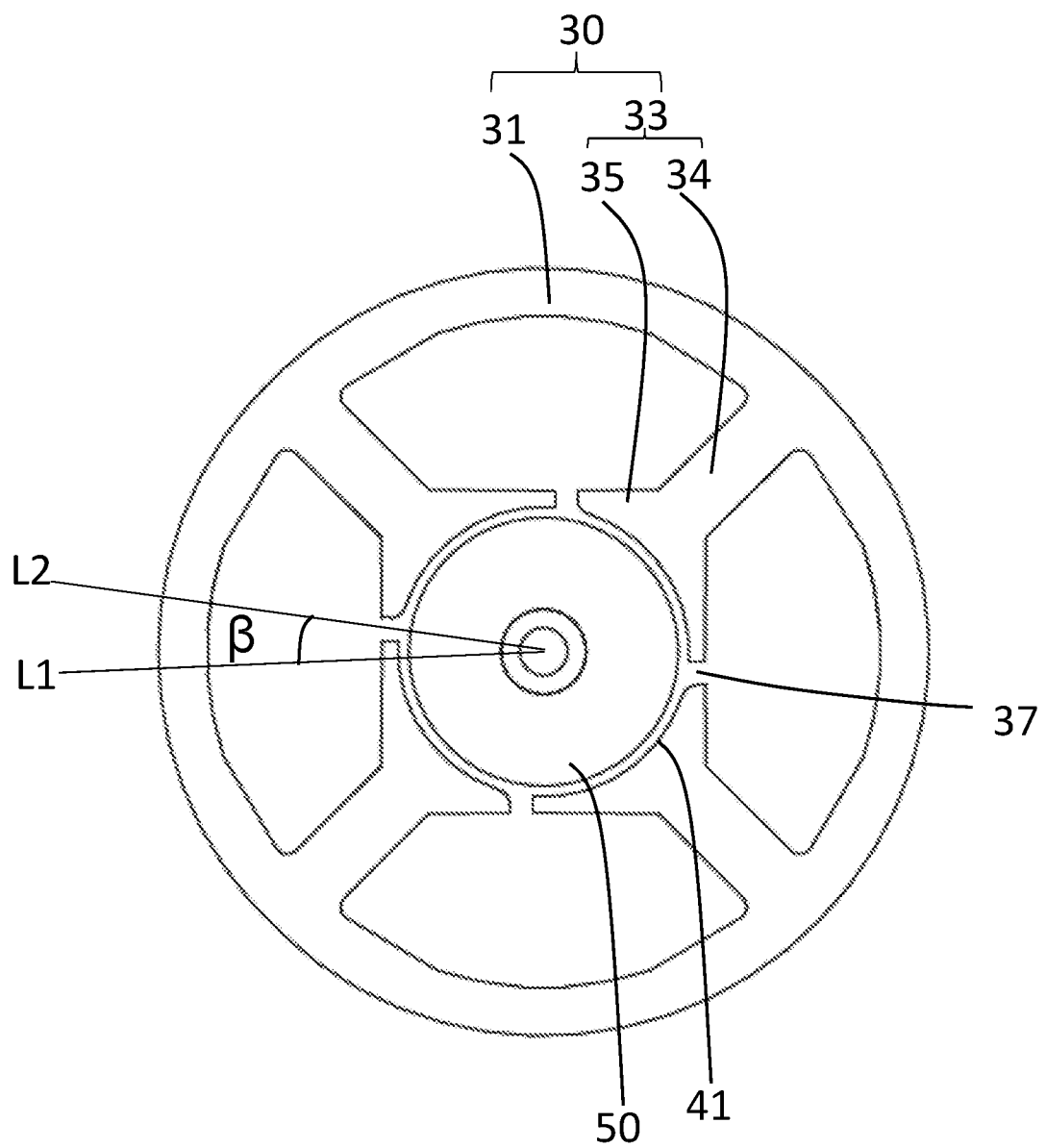
FIG. 4 illustrates the single phase brushless motor of FIG. 2, with the outer housing, stator winding, rotary shaft of the rotor removed.
Figure 5:
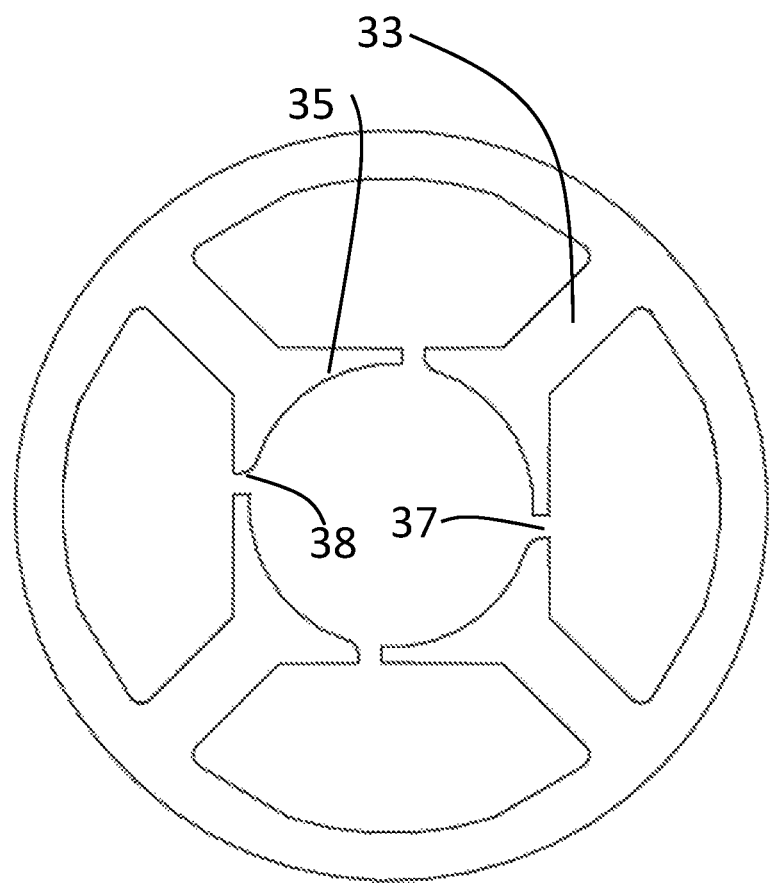
FIG. 5 illustrates the stator core of the single phase brushless motor of FIG. 2.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

First Embodiment

Referring to FIG. 1, a fluid generating device of the present invention includes a single phase motor 10 and an impeller 100 connected to a power output end of the single phase brushless motor. The motor 10 can drive the impeller 100 directly through its output shaft. Alternatively, the motor is decelerated by a speed reduction mechanism before driving the impeller 100.

Referring to FIG. 2 to FIG. 6, a single phase permanent magnet motor 10 in accordance with the first embodiment of the present invention includes a stator 20 and a rotor 50 rotatable relative to the stator.

Figure 12:
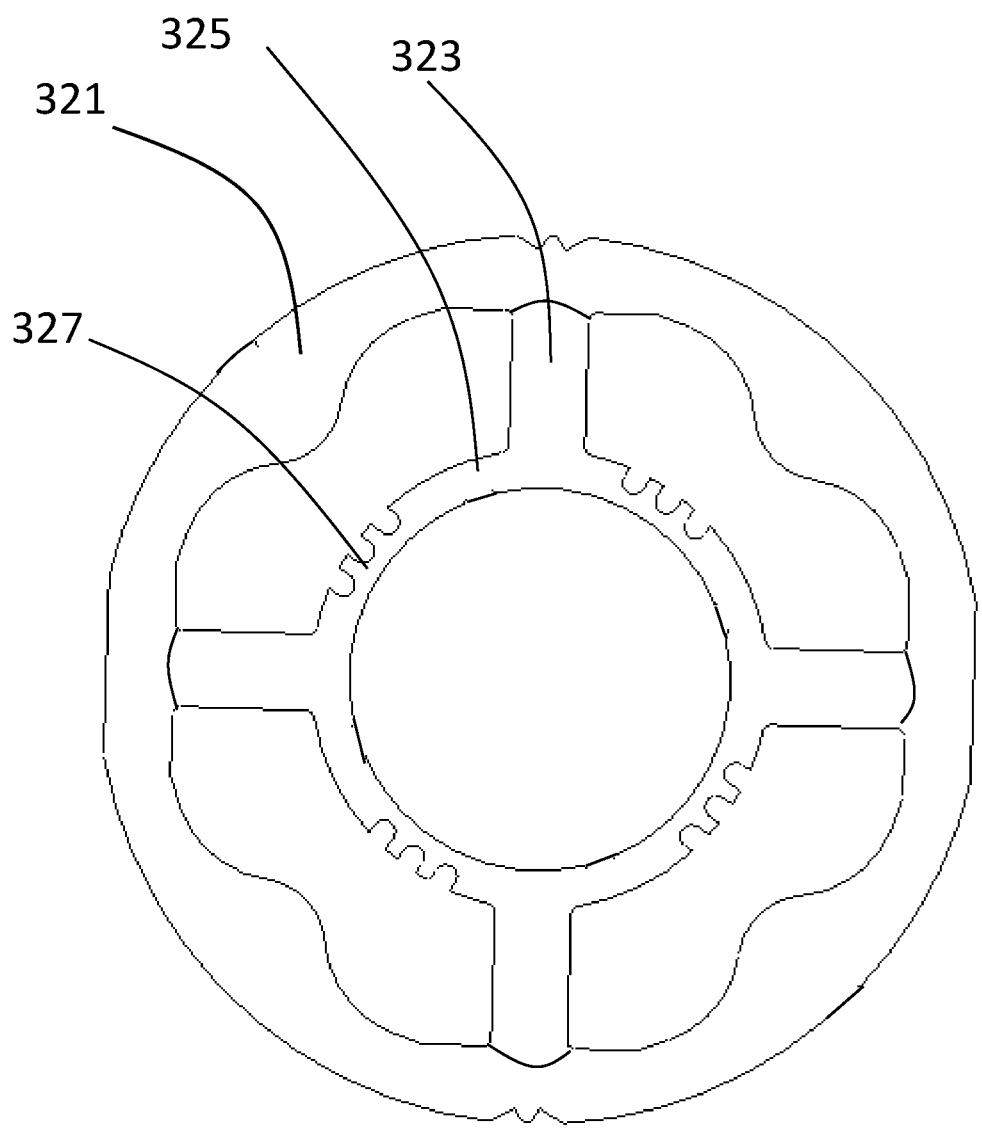
FIG. 12 illustrates a stator core of a single phase permanent magnet motor according to a fifth embodiment of the present invention.
Figure 13:
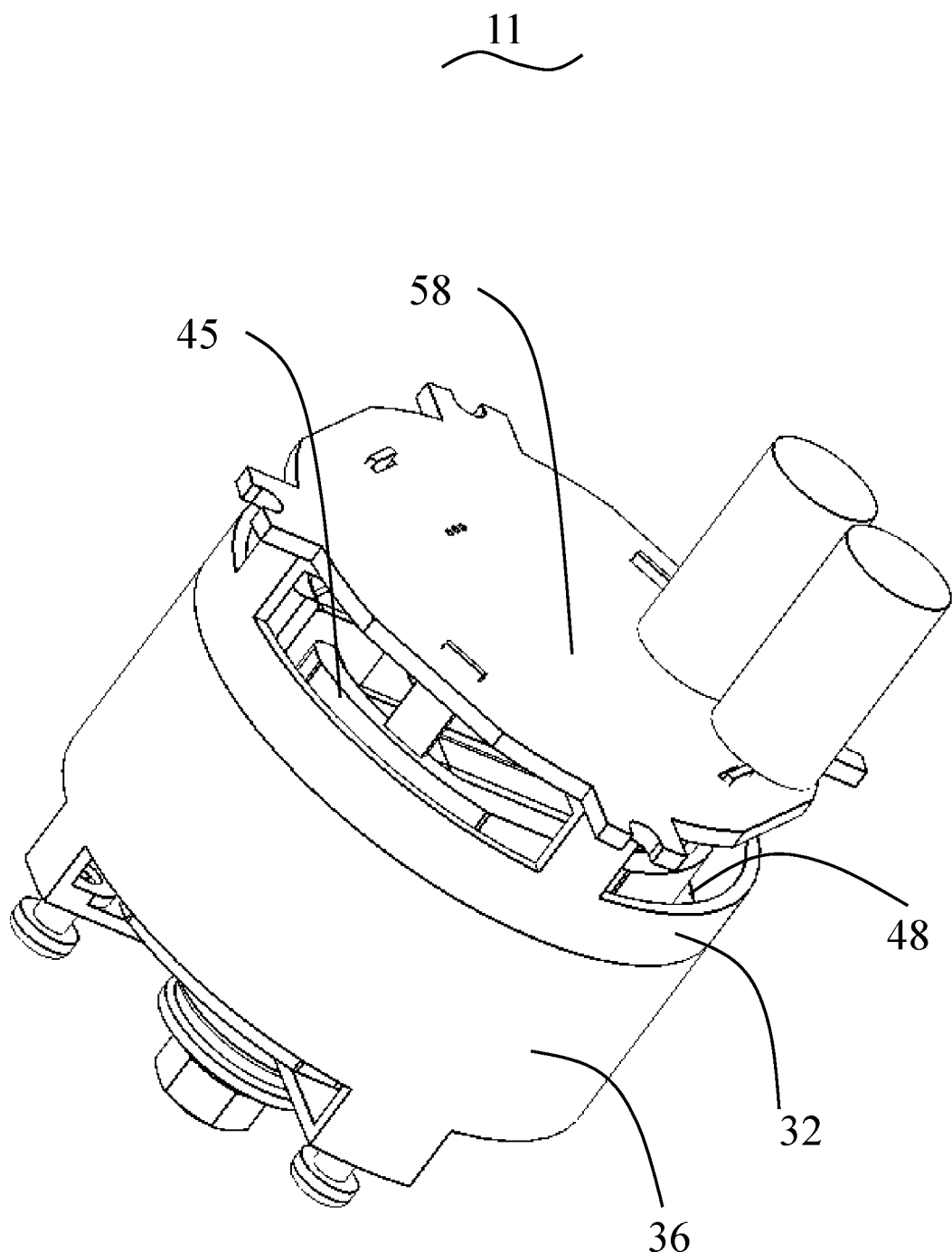
FIG. 13 illustrates a single phase brushless motor according to a sixth embodiment of the present invention.

The stator 20 includes a cylindrical outer housing 21 with one open end, an end cap 23 mounted to the open end of the outer housing 21, a stator core 30 mounted in the outer housing 21, an insulating bracket 40 mounted to the stator core 30, and a stator winding 39 wound around the stator core and supported by the insulating bracket 40. The stator core 30 includes an outer ring portion 31, a plurality of teeth 33 extending inwardly from the outer ring portion 31. Each tooth 33 comprises a tooth body 34 and two pole shoes 35 extending respectively from a distal end of the tooth body 34 to two circumferential sides of the tooth body 34. The stator winding 39 is preferably wound around the respective teeth body 34. Alternatively, the winding 39 may be wound around the outer ring portion 31. A winding slot is formed between each two adjacent teeth 33, and a slot opening 37 is formed between the pole shoes 35 of two adjacent teeth 33. Preferably, the slot opening 37 is offset from a middle position between the two adjacent teeth (i.e. closer to one tooth and farther from the other) to position the rotor at an initial state. It should be understood that the pole shoes 35 of the adjacent teeth 33 may also be connected through a magnetic bridge, as shown in FIG. 12. The slot opening 37 or magnetic bridge 327 has a large magnetic reluctance, thereby reducing magnetic leakage at the slot opening 37 or magnetic bridge 327 by avoiding or reducing magnetic flux through the slot opening 37 or magnetic bridge 327.

The stator core 30 is made from a magnetic-conductive material. For example, the stator core 30 is formed by stacking magnetic laminations (silicon laminations commonly used in the industry) along an axial direction of the motor. Preferably, the teeth 33 of the stator core 30 are spacingly and uniformly arranged along the circumferential direction of the motor. Each tooth 33 extends substantially radially inward from the outer ring portion 31. The pole shoes 35 extend from the radial inner end of the tooth body 34 to two circumferential sides of the tooth body 34.

Preferably, the pole shoe 35 has a radial thickness gradually decreasing in a direction from the tooth 33 toward the slot opening, such that a magnetic reluctance of the pole shoe 35 gradually increases in the direction from the tooth 33 toward the slot opening. This design can achieve more stable motor operation and improved startup reliability.

The rotor 50 is received in a space cooperatively defined by the pole shoes 35 of the teeth. The rotor 50 includes annular permanent magnetic poles 55 disposed along a circumferential direction of the rotor. An outer circumferential surface of the annular permanent magnetic poles 55 is concentric with an inner circumferential surface of the pole shoes 35, thus defining an even air gap 41 between the two. Specifically, the inner surface of the pole shoes is located on a circle centered at the center of the rotor 50 in an axial plane view. An outer surface 56 of the annular permanent magnetic poles is a cylindrical surface located on a circle centered at the center of the rotor 50. That is, the inner circumferential surface of the pole shoes is concentric with the outer circumferential surface of the permanent magnetic poles 55, thus defining the substantially even air gap between the inner circumferential surface of the pole shoes and the outer circumferential surface of the permanent magnetic poles. Preferably, the slot opening 37 has a width greater than zero and less than or equal to four times of a thickness of the even air gap 41. This configuration can make startup and rotation of the motor smoother, improve the startup reliability of the motor, and reduce the startup dead point. The ring portion as used in this disclosure refers to a closed structure formed by extending continuously along the circumferential direction. The thickness of the even air gap 41 refers to a radial thickness of the air gap.

Figure 6:
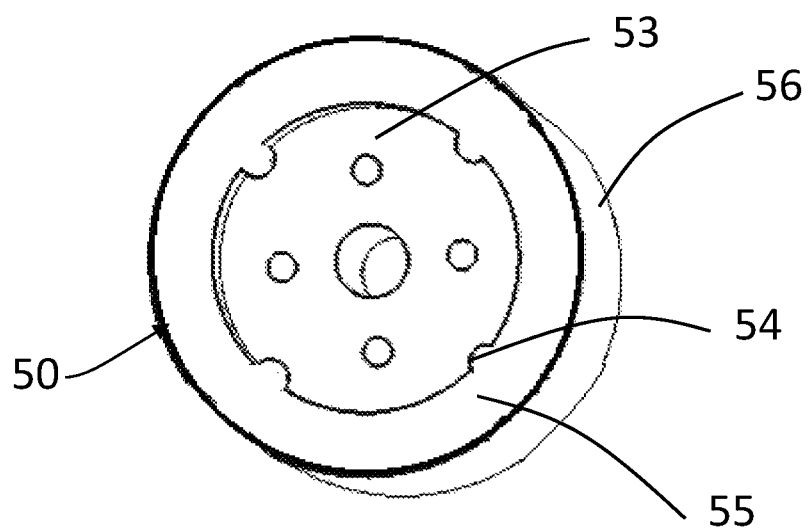
FIG. 6 illustrates the rotor core and its permanent magnet of the single phase brushless motor of FIG. 2.

Referring to FIG. 6, the annular permanent magnetic poles 55 may be formed by a single annular permanent magnet. In addition, the rotor 50 further includes a rotary shaft 51 passing through the annular permanent magnetic poles 55. One end of the rotary shaft 51 is mounted to the end cap 23 through a bearing 24, and the other end is mounted to a bottom of the cylindrical outer housing 21 of the stator through another bearing, such that the rotor is capable of rotation relative to the stator.

In this embodiment, the rotor 50 further includes a rotor core 53. The rotary shaft 51 passes through a center of the rotor core 53 and is fixed to the rotor core 53. The annular permanent magnet is mounted to an outer circumferential surface of the rotor core 53. The outer circumferential surface of the rotor core is formed with a plurality of axially-extending grooves 54. Each groove 54 is disposed at a junction of two adjacent permanent magnetic poles to reduce magnetic leakage.

In this embodiment, the slot opening 37 is offset from a symmetrical center between the two adjacent tooth bodies 34, i.e. each slot opening 37 is spaced from the two adjacent tooth bodies by different distances. That is, a line L2 passing the center of the slot opening 37 and the center of the rotor and a symmetrical center line L1 of the adjacent tooth bodies 34 form an angle β therebetween. Because the slot opening 37 is offset from the symmetrical center of the two adjacent teeth, the two pole shoes extending from the distal end of the tooth body 34 to circumferential sides of each tooth have a different circumferential length. An inner surface of the shorter pole shoe forms a chamber 38 adjacent the slot opening. The presence of the chamfer 38 can further reduce the area of the shorter pole shoe, which further increases the degree of non-uniformity between the two pole shoes and hence further causes the initial position of the rotor to be offset from the dead point.

Figure 7:
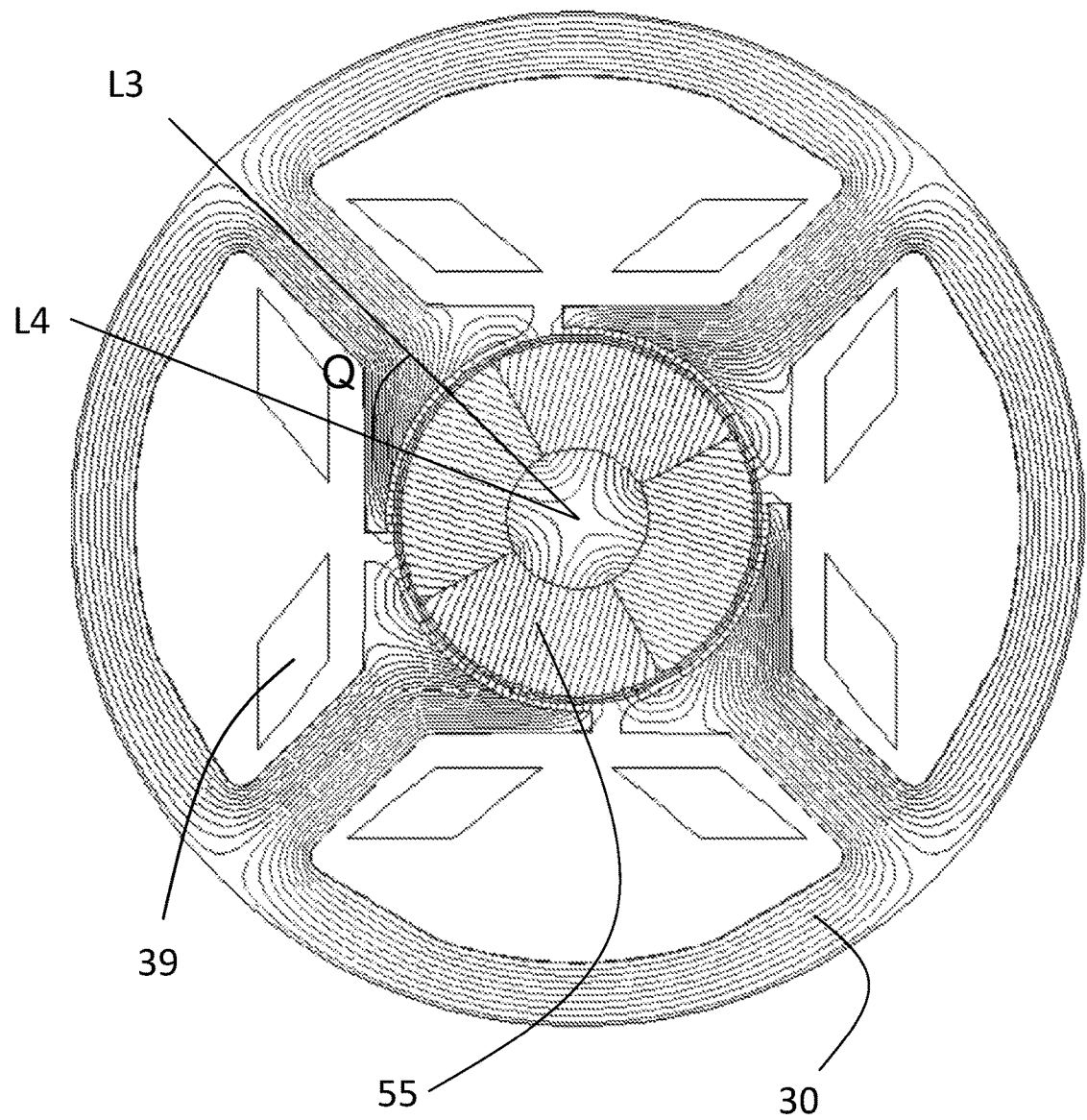
FIG. 7 illustrates a distribution of magnetic line of the rotor permanent magnetic pole of the single phase permanent magnet motor of the present invention.

FIG. 7 illustrates a distribution of magnetic line of the rotor permanent magnetic pole when the stator winding is not energized, i.e. at the initial position. As shown in FIG. 7, the rotor includes four permanent magnetic poles, with N and S polarities alternatively arranged. The stator includes four teeth forming four stator poles. As can be seen from FIG. 7, when the motor is at the initial position, the magnetic lines passing through the larger area pole shoe are obviously more than the magnetic lines passing through the smaller area pole shoe. A central radial line L4 of the rotor magnetic pole 55 is offset from a central radial line L3 of the stator pole by an angle, and the angle Q formed between the line L3 and the line L4 is called a startup angle. Preferably, the startup angle Q is equal to the angle β. In this embodiment, the startup angle is greater than a 45-degree electric angle and less than a 135-degree electric angle. When the stator winding of the motor is supplied with an electric current with one direction, the rotor 50 can be started along one direction. When the stator winding of the motor is supplied with an electric current with an opposite direction, the rotor 50 can be started along an opposite direction. It should be understood that, when the startup angle is a 90-degree electric angle, the rotor 50 can be easily started in both directions, i.e. it is the easiest angle to achieve bidirectional startup. When the startup angle is offset from the 90-degree electric angle, the rotor is easier to start in one direction than in the opposite direction. It has been found from a large number of experiments that, when the startup angle is in the range of 45-degree to 135-degree electric angle, the startup of the rotor in both directions has good reliability.

Second Embodiment

Figure 8:
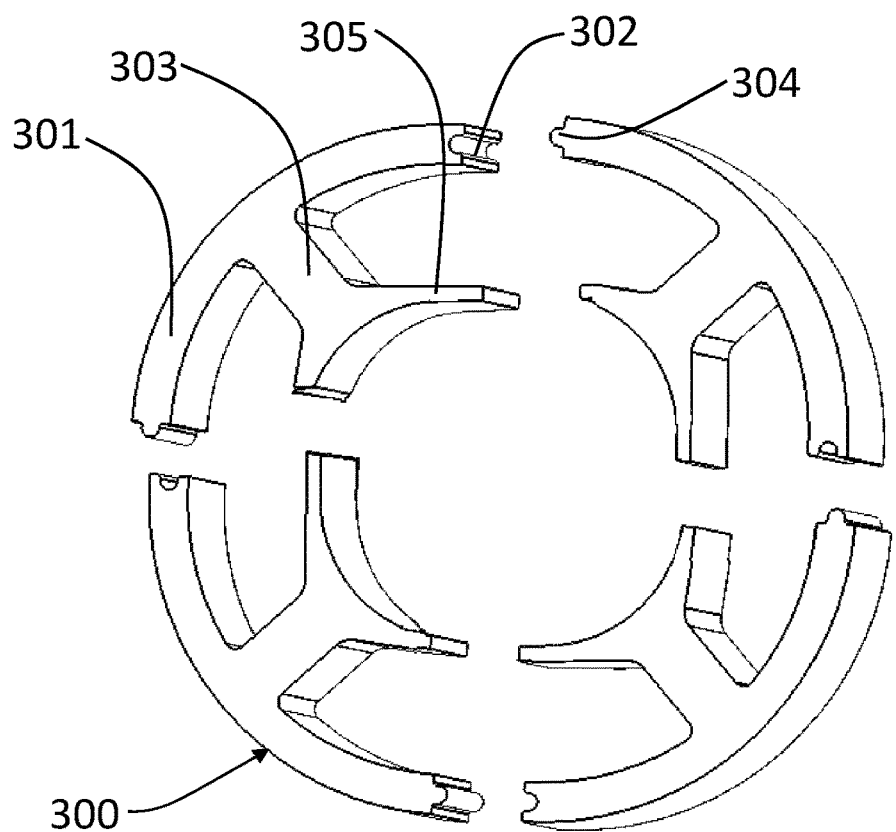
FIG. 8 illustrates a stator core of a single phase permanent magnet motor according to a second embodiment of the present invention.

Referring to FIG. 8, different from the first embodiment, in order to increase the winding efficiency of the stator winding 39, the stator core of the second embodiment includes a plurality of stator core units 300 joined along a circumferential direction of the stator. Each stator core unit 300 includes a tooth 303 with a pole shoe 305, and a yoke segment 301 integrally connected with the tooth 303. The yoke segments 301 of adjacent stator core units are connected together to form the outer ring portion of the stator core. It should be understood that, each stator core unit may also include more than one tooth 303 and corresponding pole shoes 305. After the winding process of all stator core units is completed, the stator core units 300 are joined, thus achieving the stator core with the stator winding. In this embodiment, each stator core unit 300 includes one tooth 303 and its corresponding pole shoe 305, and in each stator core unit 300, one end of the tooth 303 is connected to the yoke segment 301 between two ends thereof.

In this embodiment, the yoke segments 301 of the adjacent stator core units can be fixedly coupled with each other by welding and/or via a conventional mechanical connection structure. FIG. 7 shows an exemplary mechanical connection structure which includes a protrusion 304 engaged in a recess 302. Specifically, each yoke segment 301 of the outer ring portion has a recess 302 formed at one end thereof and a protrusion 304 at the other end thereof. The protrusion 304 of each segment 301 is engaged in the recess 302 of a corresponding adjacent segment 301.

Because the stator core is formed by joining multiple stator core units 300, the slot opening between the adjacent pole shoes 305 can have a very small width. Preferably, a minimum width of the slot opening is greater than zero and less than or equal to three times of a minimum thickness of the air gap. More preferably, the minimum width of the slot opening of the winding slot is greater than zero and less than or equal to twice of the minimum thickness of the air gap. In this embodiment, the width of the slot opening refers to the distance between the two adjacent pole shoes 305.

Figure 9:
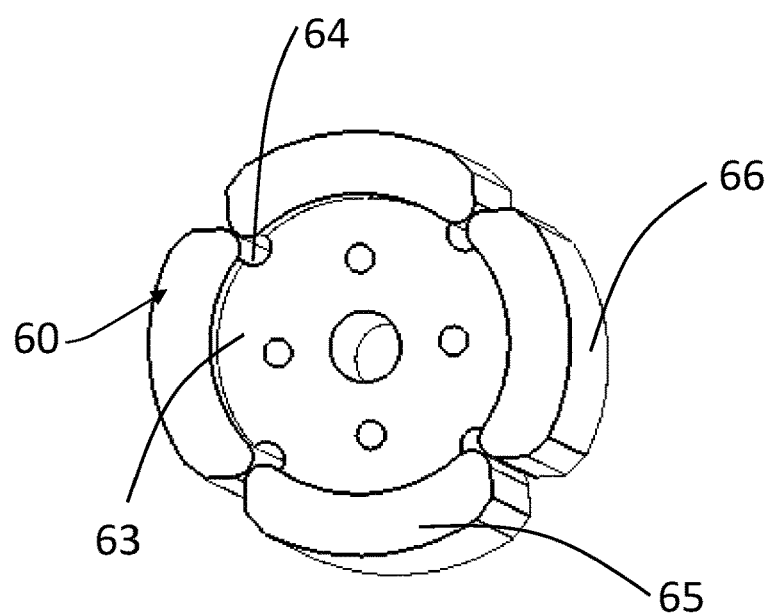
FIG. 9 illustrates a rotor core and its permanent magnet according to the second embodiment of the present invention.

Referring to FIG. 9, the rotor 60 of this embodiment includes a rotor core 63 and permanent magnetic poles 65 arranged along the circumferential direction of the rotor core 63. The permanent magnetic poles 65 are formed by a plurality of permanent magnets 66, for example four permanent magnets. The permanent magnets 66 are mounted to an outer circumferential surface of the rotor core 63. Likewise, the outer circumferential surface of the rotor core 63 is formed with a plurality of axially-extending grooves 64. Each groove 64 is disposed at a junction of adjacent two permanent magnets 66 to reduce magnetic leakage. Preferably, the inner circumferential surfaces (called as pole faces) of the pole shoes are located on a circle centered at the center of the rotor 60, and outer surfaces of the permanent magnets 66 are located on a circle centered at the center of the rotor 60. As such, the outer surfaces of the permanent magnets 66 are concentric with the inner surfaces of the pole shoes, whereby a substantially even air gap is formed between the pole shoes and the permanent magnetic poles. The reason of the term "substantially even air gap" is that, a major part of the air gap is even except for those parts corresponding to the chamfers of the permanent magnetic poles, gaps between adjacent magnetic poles, chambers of the pole shoes, and the slot openings between adjacent pole shoes.

Third Embodiment

Figure 10:
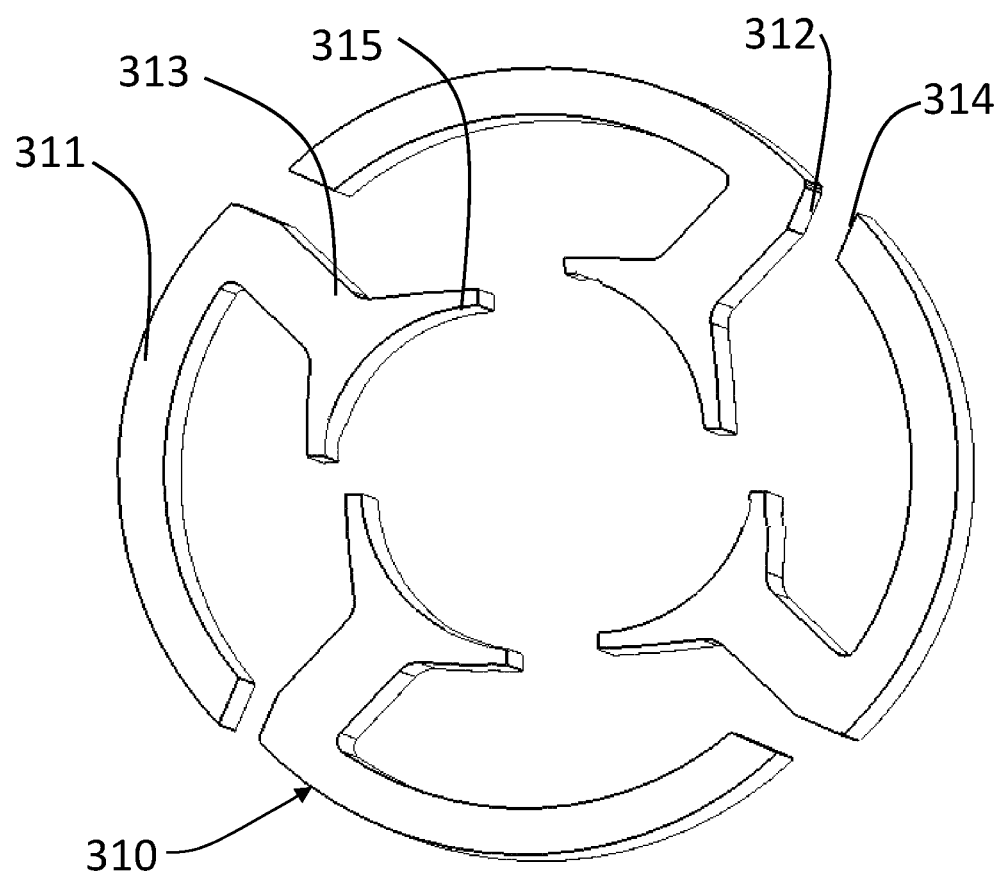
FIG. 10 illustrates a stator core of a single phase permanent magnet motor according to a third embodiment of the present invention.

Referring to FIG. 10, in this embodiment, the stator core likewise includes a plurality of stator core units 310 joined along the circumferential direction of the stator. Each stator core unit 310 includes a tooth 313 with a pole shoe 315, and a yoke segment 311 integrally connected with the tooth 313. The yoke segments 311 of adjacent stator core units are connected together to form the outer ring portion of the stator core. It should be understood that, each stator core unit may also include more than one tooth 313 and corresponding pole shoes 315. After the winding process of all stator core units is completed, the stator core units 300 are joined, thus achieving the stator core with the stator winding. In this embodiment, each stator core unit 310 includes one tooth 313 and its corresponding pole shoe 315, and in each stator core unit 310, one end of the tooth 313 is connected to the yoke segment 311 between two ends thereof.

In this embodiment, the joining faces of the yoke segments 311 of the adjacent stator core units are plane faces, and the adjacent yoke segments 311 can be assembled together directly by welding or in another manner. Preferably, in order to achieve better end to end contact between the adjacent arcuate yoke segments, the ends of the yoke segments 311 of the adjacent stator core units are provided with inter-engagement chamfers. Specifically, the two ends of the yoke segment 311 of each stator core unit may be respectively provided with a first chamfer 312 and a second chamfer 314 that are in close contact with each other.

Because the stator core is formed by joining multiple stator core units 310, the winding process can be performed before the joining process and, therefore, the slot opening between the adjacent pole shoes 315 can have a very small width. Preferably, a minimum width of the slot opening is greater than zero and less than or equal to three times or twice of a minimum thickness of the air gap.

In the single phase permanent magnet motor of this embodiment, the slot opening is formed between adjacent pole shoes of two adjacent teeth and is offset from one of the two teeth. Therefore, the startup angle and cogging torque required for the startup of the single phase permanent magnet motor are adjusted by adjusting the location and size of the slot opening, without the need of additional positioning slots or positioning holes formed at the pole faces of the pole shoes. For example, the startup angle is adjustable by adjusting the degree of offset of the slot opening from one of the teeth. When the startup angle is in the range of 45-degree to 135-degree electric angle, the rotor of the motor can be started in both directions, which makes the startup reliable.

Fourth Embodiment

Figure 11:
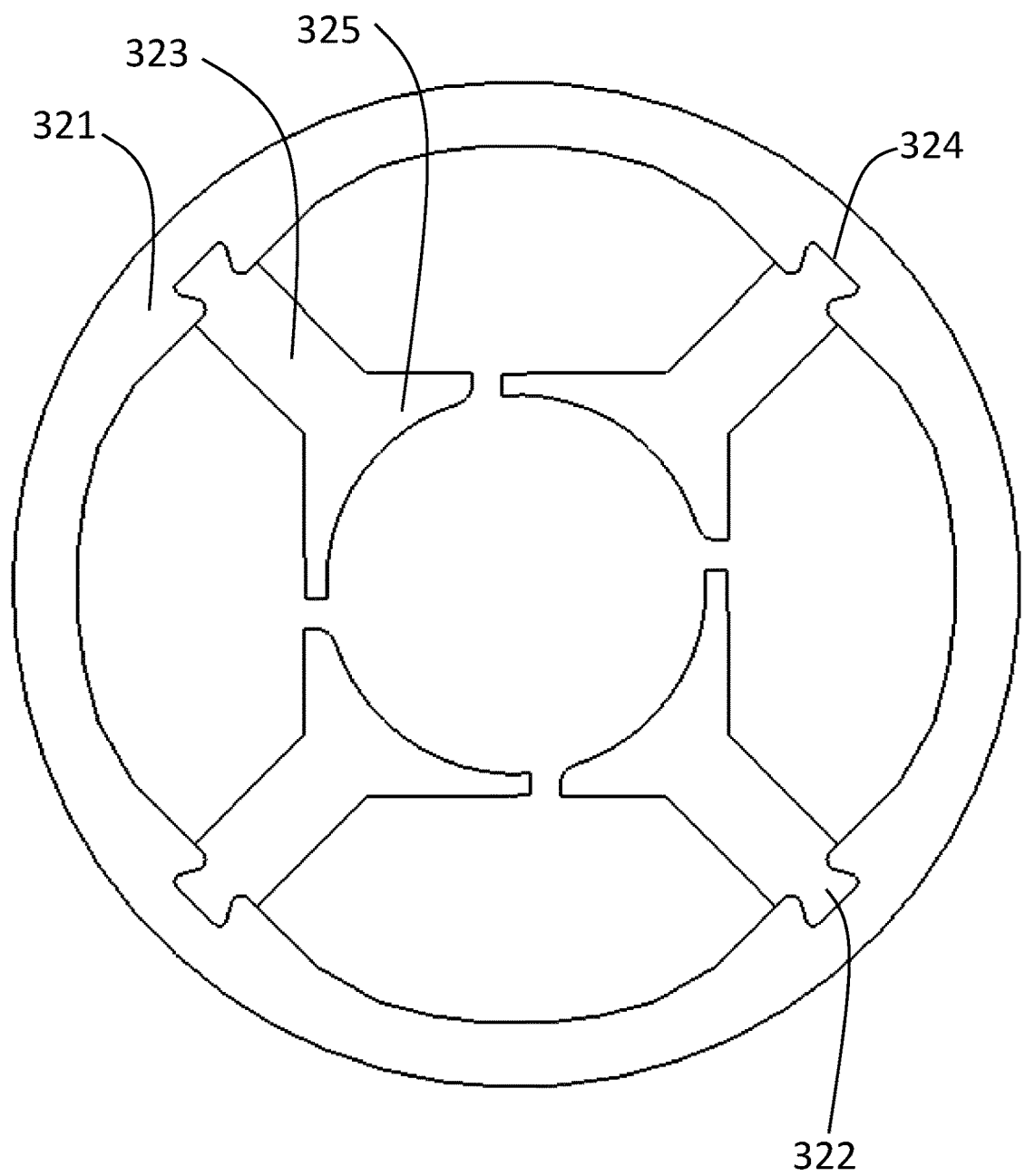
FIG. 11 illustrates a stator core of a single phase permanent magnet motor according to a fourth embodiment of the present invention.

Referring to FIG. 11, likewise, the stator core of this embodiment is of a separate-type structure in order to increase the winding efficiency of the stator winding. Specifically, the teeth 323 and associated pole shoes 325 are integrally formed into a single integral structure, while the teeth 323 and the outer ring portion 321 are separate structures, i.e. the outer ring portion 321 and the teeth 323 are separately formed and then assembled together. The joining faces of the teeth 323 and the outer ring portion 321 can be plane faces or recess-protrusion engaging faces 322, 324. It should be understood that each tooth 323 may be fixedly connected to the outer ring portion 321 by welding or various mechanical connecting manners (e.g. a dovetail joint). In an alternative embodiment, the teeth 323, outer ring portion 321 and the associated pole shoes 325 are all separately formed, and the teeth 323 are fixedly connected to the outer ring portion 321 and the pole shoes 325 after the stator winding 39 is wound.

The single phase brushless motor of this embodiment uses annular permanent magnetic poles, and the inner surfaces of the pole shoes of the stator core are located on a circle centered at the center of the rotor in the axial plane view, thus better forming the even air gap and reducing the vibration and noise due to the slot openings in the prior art. In addition, the width of the slot opening is greater than zero and less than or equal to four times of the thickness of the even air gap, or further, the minimum with of the slot opening is less than or equal to two times of the even air gap, such that the motor can have a greater torque density and the magnetic leakage can be reduced. The stator core is of a separate-type structure, which facilitates the winding process and hence effectively improves the winding efficiency.

Fifth Embodiment

Referring to FIG. 12 to FIG. 15, a single phase motor 11 in accordance with another embodiment is illustrated. The motor 11 includes a stator and a rotor. The stator includes a stator housing, a stator core 48, stator windings 49 wound around the stator core 48, and a control circuit board 58 mounted to one end of the stator. The stator housing includes two half housing portions 36, 32. Each half housing portion includes a cylindrical sleeve, a hub 25 disposed at an outer end of the cylindrical sleeve, and a plurality of spokes 28 connected between the cylindrical sleeve and the hub 25. A bearing 27 is mounted in the hub 25. The stator core 48 is mounted to an inner wall surface of the cylindrical sleeve. In this embodiment, the single phase motor 11 is a single phase permanent magnet direct current brushless motor 11.

The rotor includes a rotary shaft 61 and a permanent magnet 67 (see FIG. 16) fixed to the rotary shaft. A thickness of the permanent magnet 67 is 0.4 to 0.48 times an outer diameter of the rotor. Opposite ends of the rotary shaft 61 extend through the hubs 25 of the two half housing portions 36, 32 and are supported by the bearings 27 mounted in the hubs 25, respectively.

Figure 14:
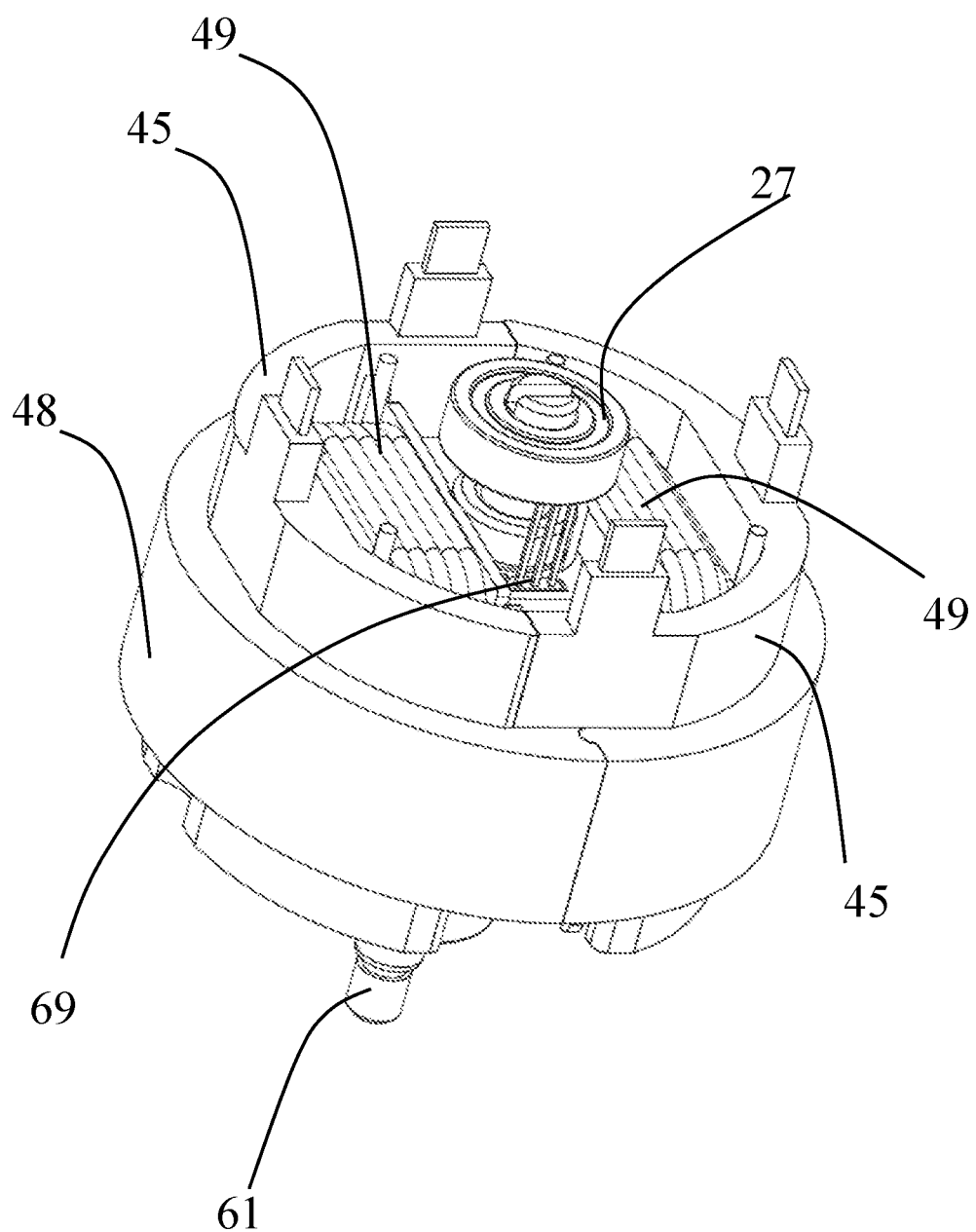
FIG. 14 illustrates the single phase brushless motor of FIG. 13, with the stator housing removed.
Figure 15:
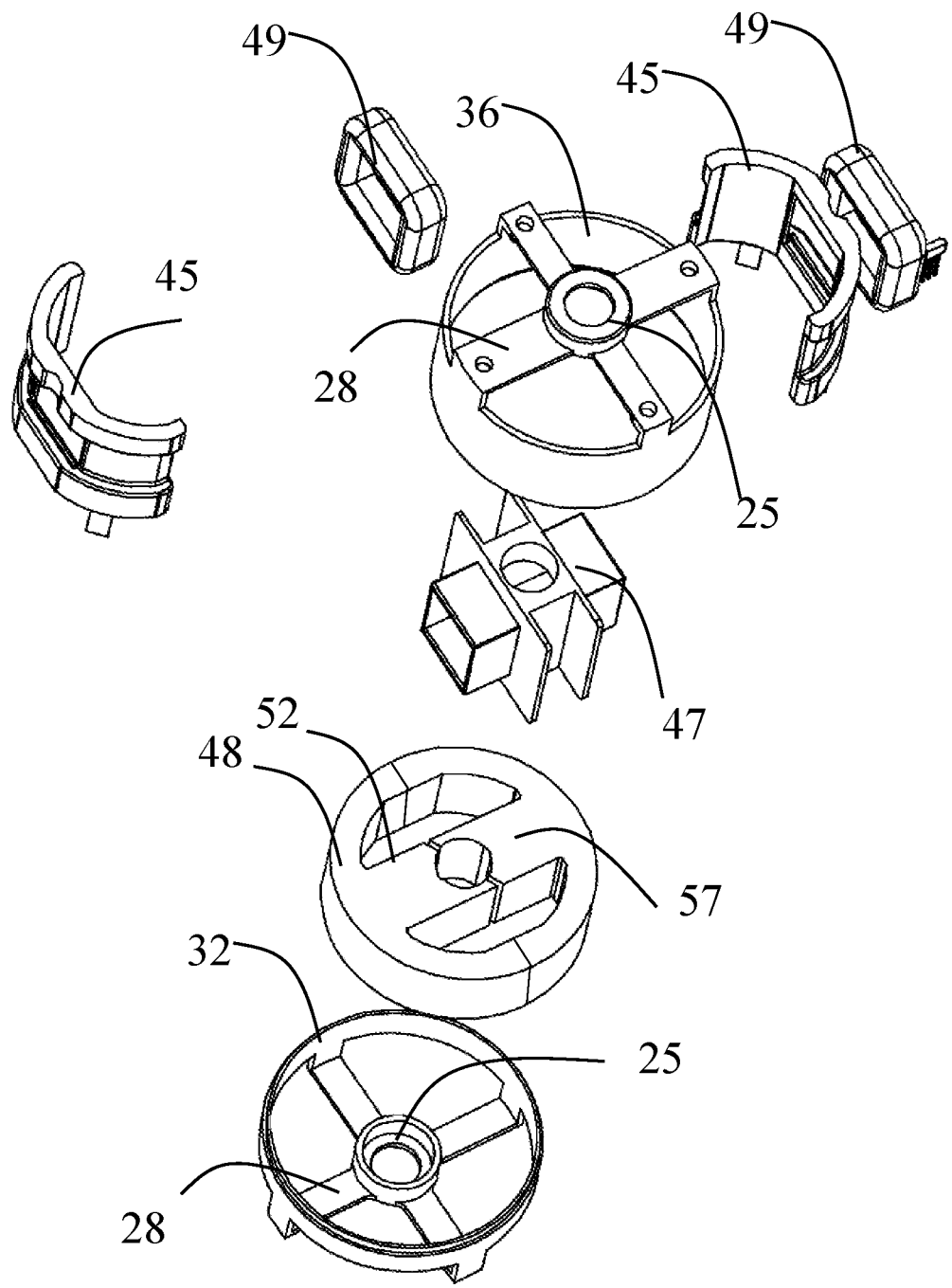
FIG. 15 is an exploded view of the stator of the single phase brushless motor of FIG. 13.

Referring to FIG. 14 and FIG. 15, an insulating bracket 47 is disposed between teeth 52, 57 of the stator core 48 and the stator windings 49. Two insulating linings 45 are disposed between an outer ring portion (i.e. yoke) of the stator core 48 and the two stator windings 49, respectively, for isolating the stator windings 49 from the stator core 48. In this embodiment, the insulating lining 45 is attached to an inner surface of the outer ring portion of the stator core 48 and has a through hole for allowing the corresponding tooth 52 or 57 to pass there through.

Figure 16:
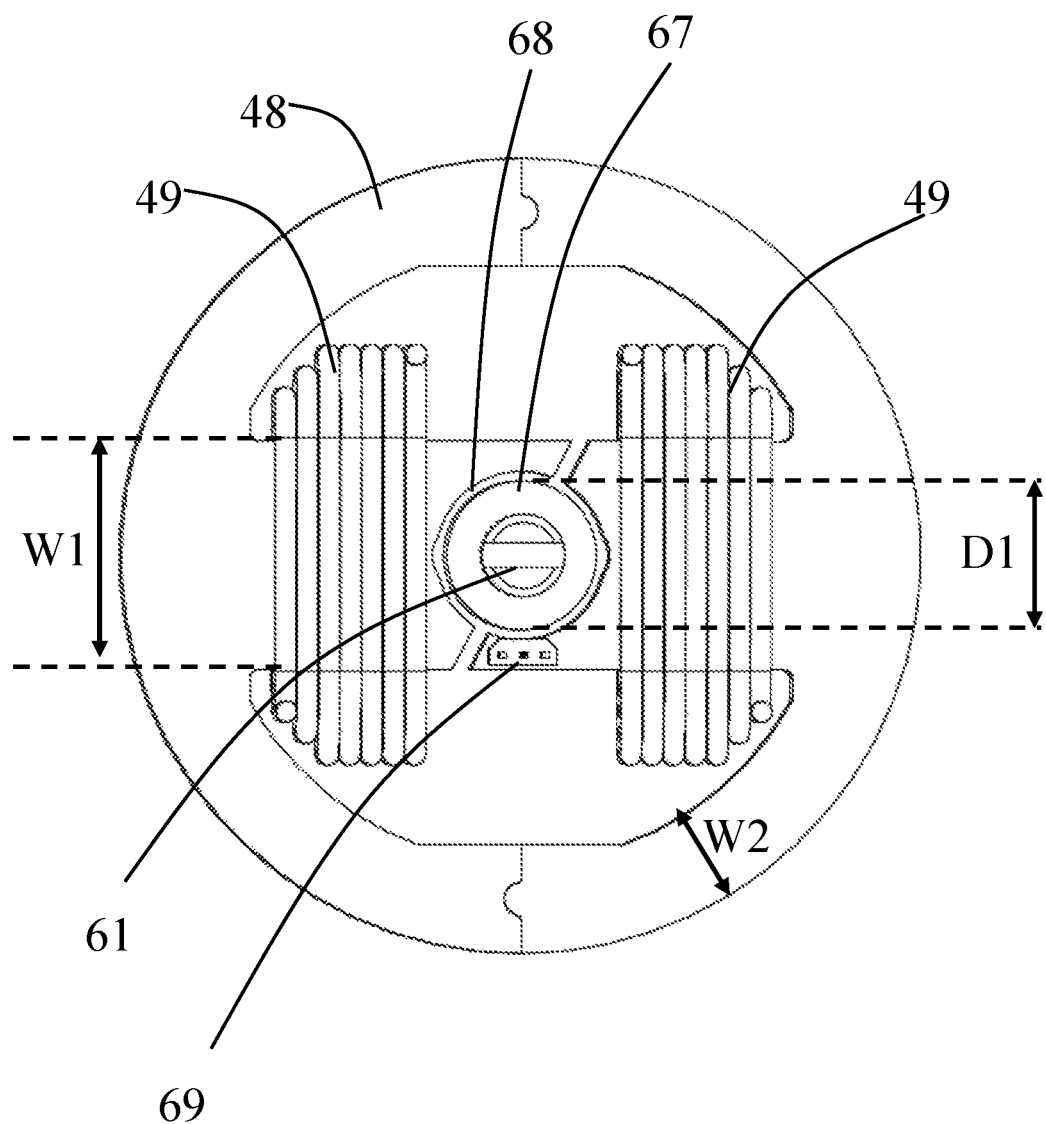
FIG. 16 illustrates the single phase brushless motor of FIG. 13, with a winding bracket, a first insulating lining and a second insulating lining being removed.
Figure 17:
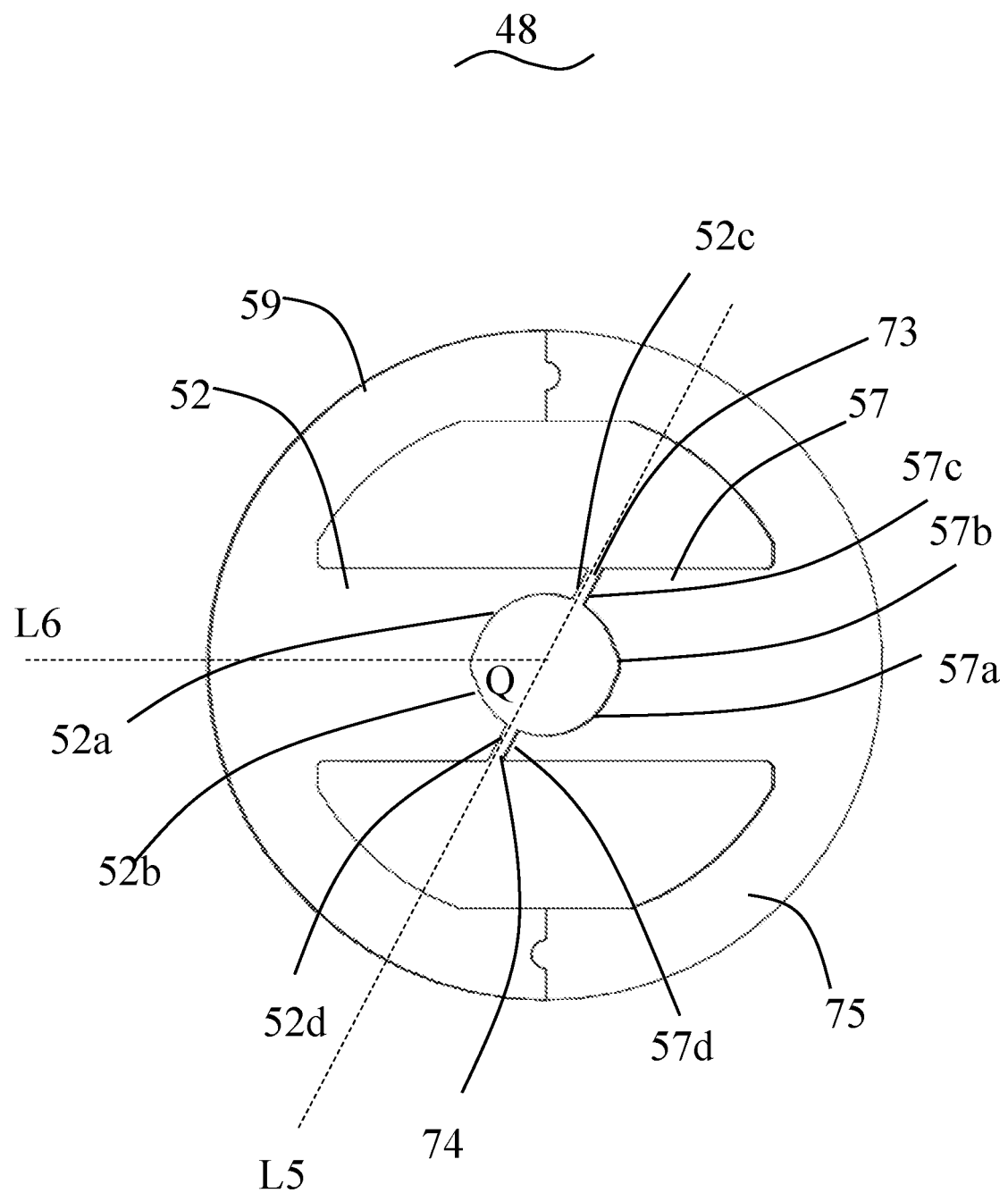
FIG. 17 illustrates a stator core of the single phase brushless motor of FIG. 1.

Referring to FIG. 16 and FIG. 17, the stator core 48 consists of a first half core portion and a second half core portion. Joining faces of the first half core portion and the second half core portion are provided with recess-protrusion engagement structures. The first half core portion includes a first half yoke portion 59 and a first tooth 52 extending from the first half yoke portion 59 toward a center of the stator core. The second half core portion includes a second half yoke portion 75 and a second tooth 57 extending from the second half yoke portion 75 toward the center of the stator core. The first half yoke portion 59 and the second half yoke portion 75 cooperatively form the outer ring portion or ring-shaped yoke.

The first tooth 52 and second tooth 57 have a width W1 perpendicular to the extension direction of the first tooth 52, and the width W1 is 1.4 to 1.6 times an outer diameter D1 of the rotor. The outer ring portion has a thickness W2 along a radial direction of the stator, and the thickness W2 of the outer ring portion is 0.5 to 0.7 times the outer diameter D1 of the rotor. The inner surface (pole face) of the two pole shoes of the first tooth 52 includes a first arc surface 52a with a first positioning groove 52b formed therein. The inner surface (pole face) of the two pole shoes of the second tooth 57 includes a second arc surface 57a with a second positioning groove 57b formed therein. The first positioning groove 52b and the second positioning groove 57b are opposed to each other along a diametrical direction of the rotor, for controlling the initial position of the rotor relative to the stator when the stator winding is de-energized. A stop position or an initial position of the rotor can be adjusted by adjusting the positions of the positioning grooves 52b, 57b. The first arc surface 52a and the second arc surface 57a are opposed to each other to form a receiving cavity/chamber there between in which the permanent magnet 67 is received. The permanent magnet 67 forms two permanent magnetic poles for interacting with the first teeth 52 and the second tooth 57. A substantially even air gap 68 is formed between the outer circumferential surface of the permanent magnetic poles of the rotor and the pole faces 52a, 57a of the stator. The reason of the term "substantially even air gap" is that, a major part of the air gap is even except for those parts corresponding to the positioning grooves 52b, 57, chamfers of the magnetic poles and chamfers of the pole shoes. A thickness of the even air gap 68 is 0.26 to 0.34 times the thickness of the permanent magnet 67.

A sensor 69 such as a Hall sensor is connected to the circuit board 58 (FIG. 12) through terminals, for detecting the rotational position of the permanent magnet 67.

The stator windings 49 are preferably wound around the first tooth 52 and the second tooth 57. In particular, the winding bracket 47 includes a hollow first mounting arm 48a and a hollow second mounting arm 48b extending toward ends of the first tooth 52 and the second tooth 56, respectively. The first tooth 52 extends into the first mounting arm 48a, and the second tooth 56 extends into the second mounting arm 48b. Each stator winding 49 is wound around an exterior of a corresponding one of the first mounting arm 48a and the second mounting arm 48b, i.e. the stator windings 49 and the first tooth 52/the second tooth 57 are spaced by the first mounting arm 48a and the second mounting arm 48b, respectively. Upon being energized, the stator windings 49 can produce two magnetic circuits that pass through the rotor.

The first tooth 52 and the second tooth 57 form there between a first slot opening/magnetic bridge 73 and a second slot opening/magnetic bridge 74 with great magnetic reluctance at opposite sides of the permanent magnet 67, respectively. In this embodiment, the first tooth 52 and the second tooth 57 form there between slot openings 73 and 74. Specifically, two circumferential ends of the first arc surface 52a form a first cutting surface 52c and a second cutting surface 52d, respectively; two circumferential ends of the second arc surface 57a form a third cutting surface 57c and a fourth cutting surface 57d. The first cutting surface 52c and the third cutting surface 57c are spaced and face each other so as to formed the slot opening 73 there between, and the second cutting surface 52d and the fourth cutting surface 57d are spaced and face each other so as to form the slot opening 74 there between. The slot openings 73, 74 are inclined related to the extension direction of the first/second tooth, that is, an acute angle is formed between the extension direction of the slot opening and the extension direction of the first/second tooth.

A distance between the first cutting surface 52c and the third cutting surface 57c is 0.09 to 0.13 times the outer diameter D1 of the rotor, and a distance between the second cutting surface 52d and the fourth cutting surface 57d is also 0.09 to 0.13 times the outer diameter D1 of the rotor.

A connecting line L5 connecting centers of the slot openings 73, 74 and the rotor center and an extension direction L6 of the first tooth 52 form there between an angle Q of 60 to 65 degrees. More preferably, the connecting line connecting the centers of the slot openings 73, 74 and the extension direction of the second tooth 57 form an angle of 60 to 65 degrees. The slot openings 73, 74 are substantially the same in size and are symmetrical about the center of rotation of the rotor.

The first arc surface 52a has the first positioning groove 52b, and the second arc surface 57a has the second positioning groove 57b. An opening of the first positioning groove 52b faces toward the permanent magnet 67, and an opening of the second positioning groove 57b faces toward the permanent magnet 67. A width of the opening of the first positioning groove 52b and the second positioning groove 57b is 0.24 to 0.28 times the outer diameter D1 of the rotor. The term "width of the opening" as used herein refers to a size of the first positioning groove 52b and the second positioning groove 57b along a circumferential direction of the permanent magnet. A depth of the first positioning groove 52b into the first tooth 52 and a depth of the second positioning groove 57b into the second tooth 56 are both 0.015 to 0.035 times the outer diameter D1 of the rotor. Preferably, a line connecting the first positioning groove 52b and the second positioning groove 57b coincides with center lines of the first tooth 52 and the second tooth 57.

Figure 18:
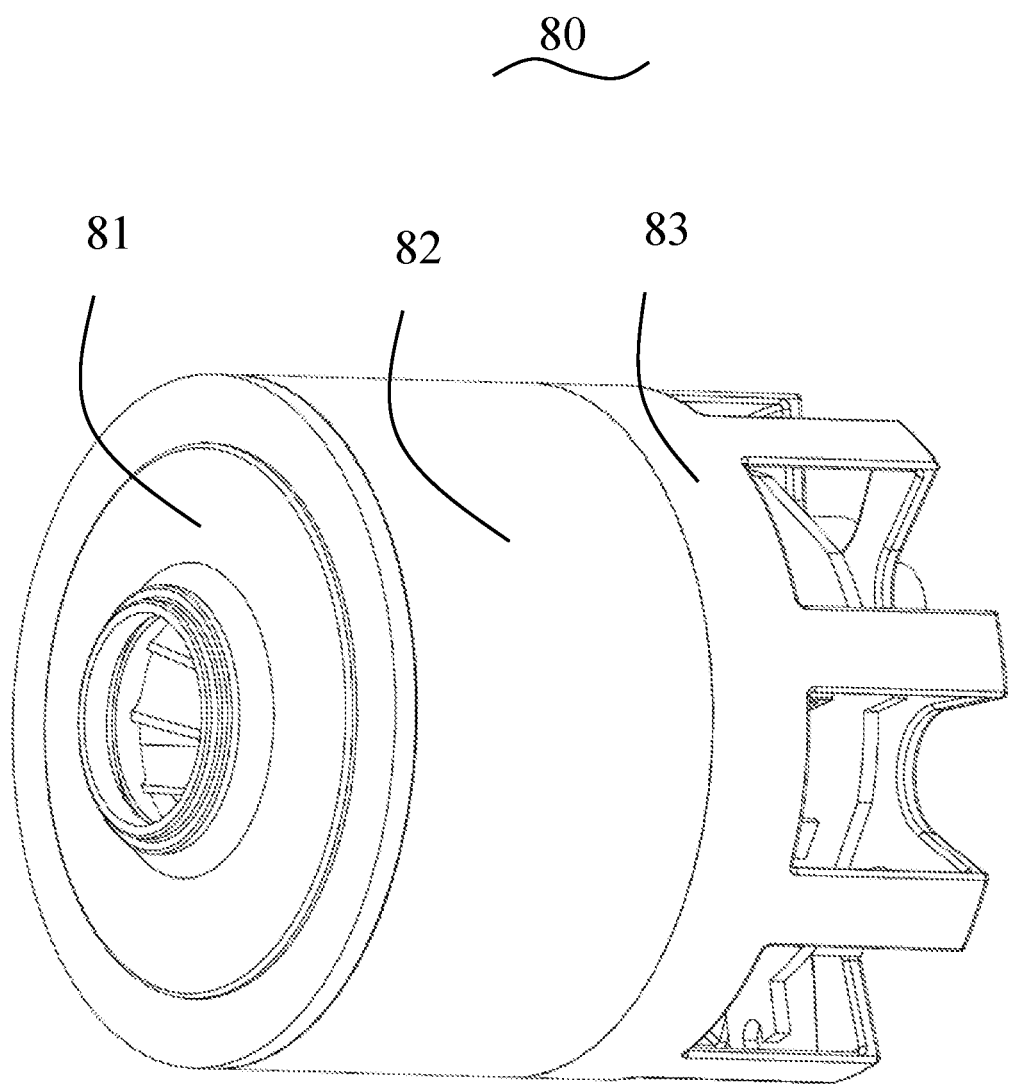
FIG. 18 illustrates a fluid generating device according to another embodiment of the present invention.

FIG. 18 illustrates a fluid generating device 80 which employs any one of the above-described single phase motors. The fluid generating device 80 further includes a centrifugal impeller 81 mounted on a rotary shaft of the single phase motor, a diffuser 82 cooperating with the centrifugal impeller 81, and a diffuser accessory 83 cooperating with the diffuser 82.

Figure 19:
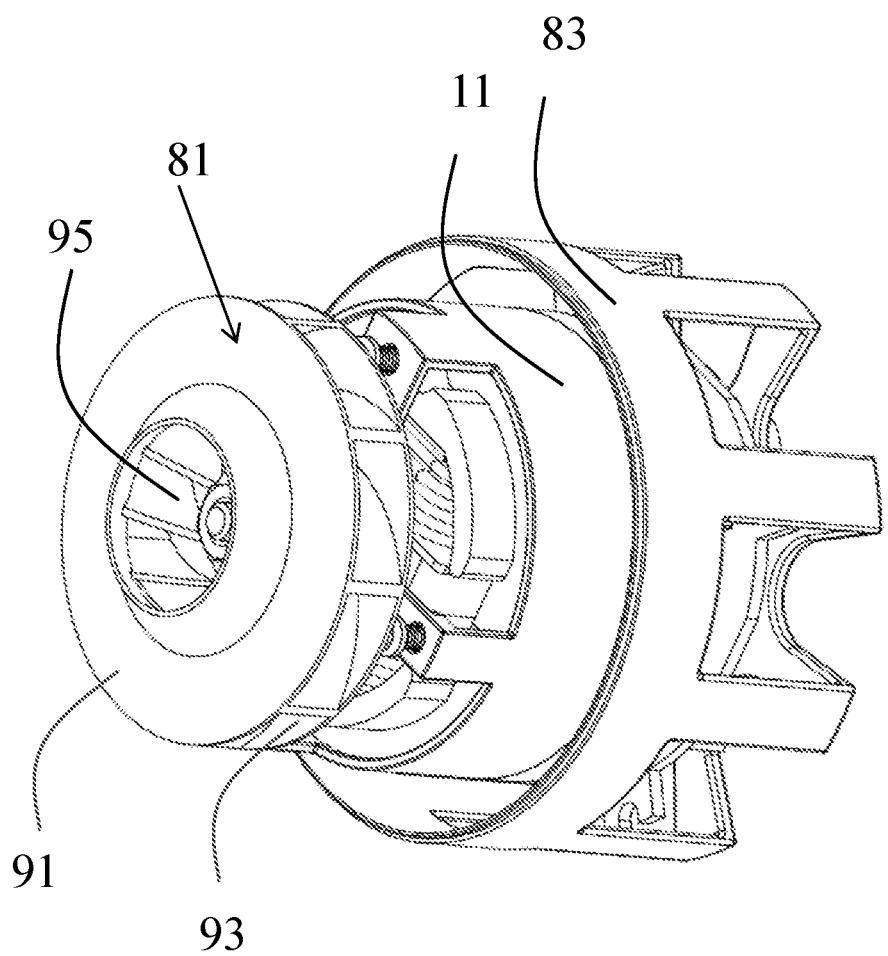
FIG. 19 illustrates the fluid generating device of FIG. 18, with a diffuser being removed.

Referring to FIG. 19, the centrifugal impeller 81 includes a front cover plate 91 and a rear cover plate 93 that are spaced apart by a preset distance. The centrifugal impeller 81 further includes a plurality of blades 95 mounted between the front and rear cover plates 91, 93. Air passages are formed between adjacent blades 95. The air passages have an inlet at a center of the centrifugal impeller 81 and an outlet along an outer periphery of the centrifugal impeller 81.

Figure 20:
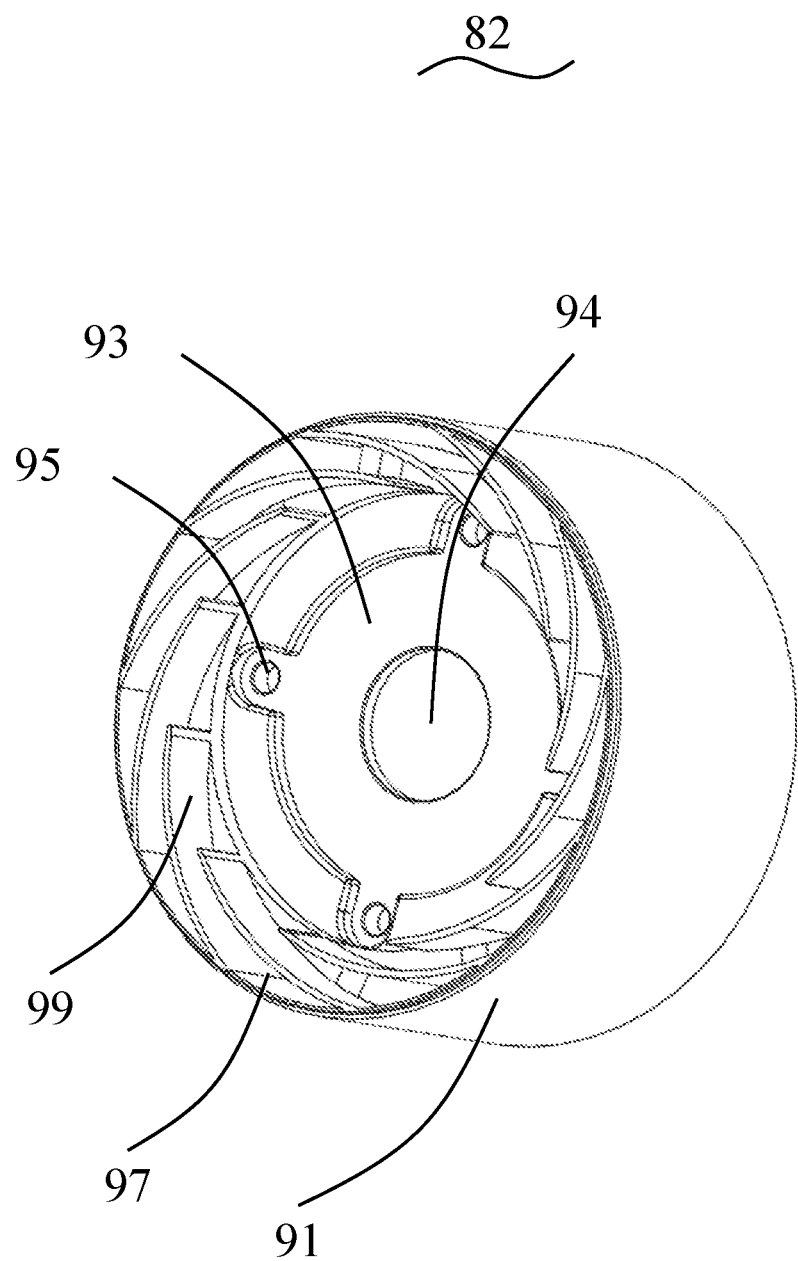
FIG. 20 illustrates a diffuser of the fluid generating device of FIG. 18.
Figure 21:
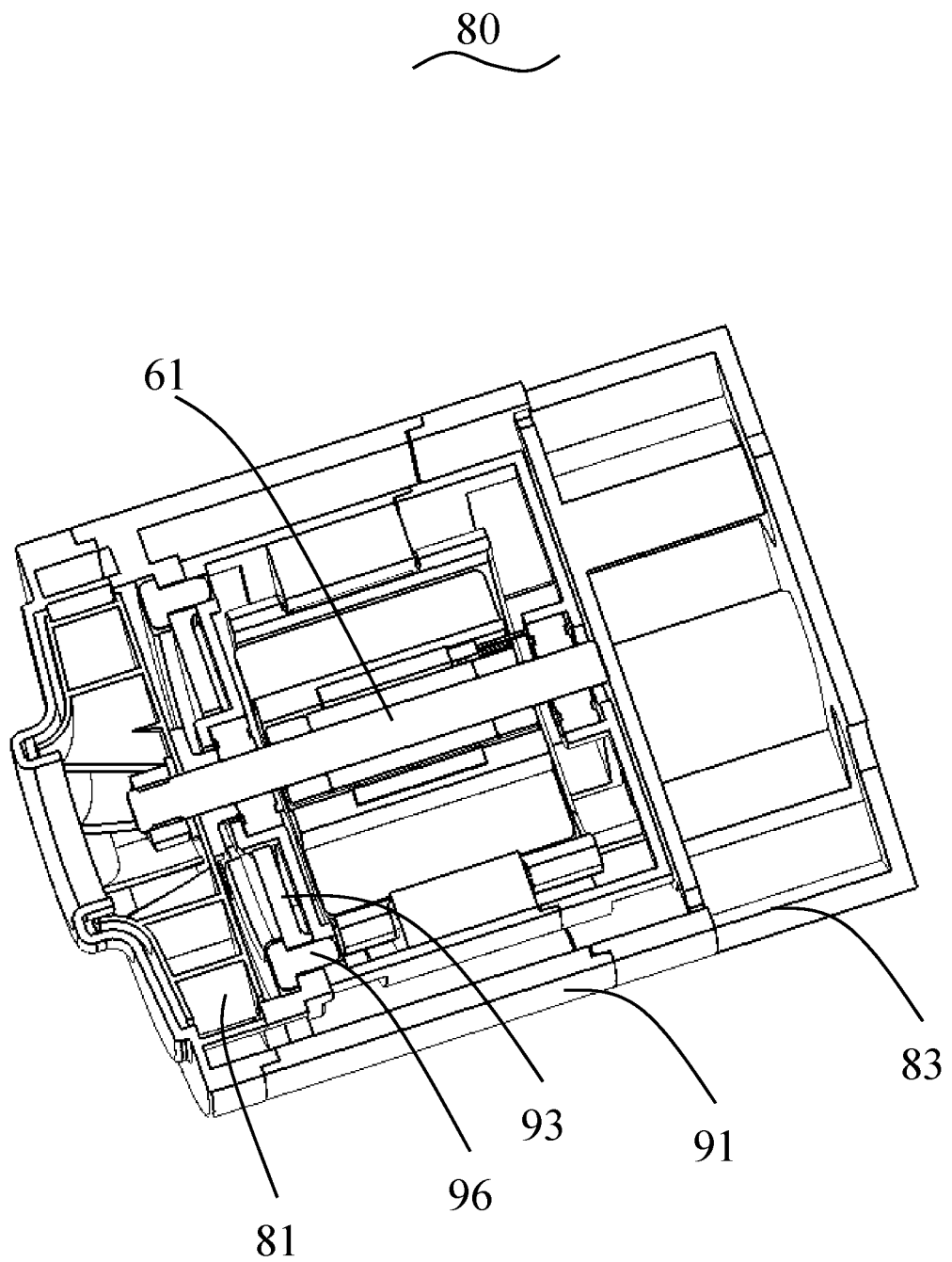
FIG. 21 is a sectional view of the fluid generating device of FIG. 18.

Referring to FIG. 20 and FIG. 21, the diffuser 82 includes a tubular outer housing 91, and a partition plate 93 mounted within the tubular outer housing 91. The partition plate 93 has a through bore 94 for allowing the rotary shaft of a motor 11 to pass there through. The partition plate 93 further includes a plurality of screw holes 95 for allowing screws 96 to pass there through to mount the diffuser to the motor 11. In this case, the tubular outer housing 91 surrounds the motor 11.

The diffuser 82 includes a plurality of diffusing vanes 99 connected to the tubular outer housing 91 and the partition plate 93. A diffusing channel 97 is formed between each two adjacent diffusing vanes 99. An inlet end of the diffusing channels 97 is in flow communication with the outlet of the centrifugal impeller 81. In this embodiment, the diffusing channels 97 passes through the partition plate 93 to guide the fluid to the diffuser accessory 83.

Figure 22:
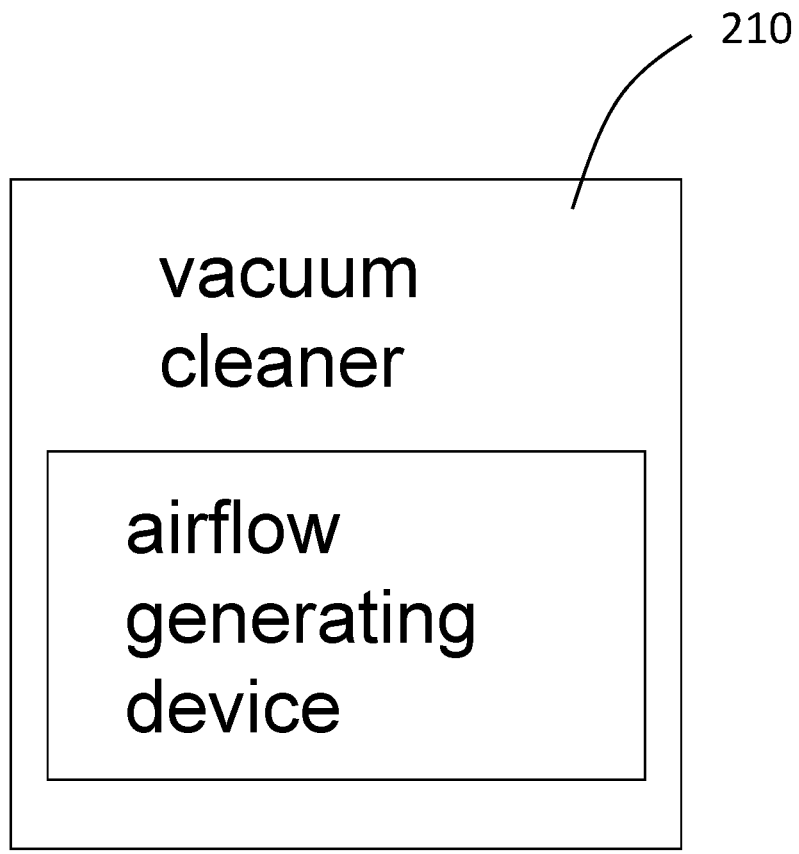
FIG. 22 illustrates the fluid generating device of the present invention which is utilized in a vacuum cleaner.

FIG. 22 illustrates a vacuum cleaner 210 which includes the above described single phase motor 10, 11 or the above described fluid generating device 80. In this embodiment, the vacuum cleaner 210 adopts known structures and therefore is not described herein in further detail.

Figure 23:
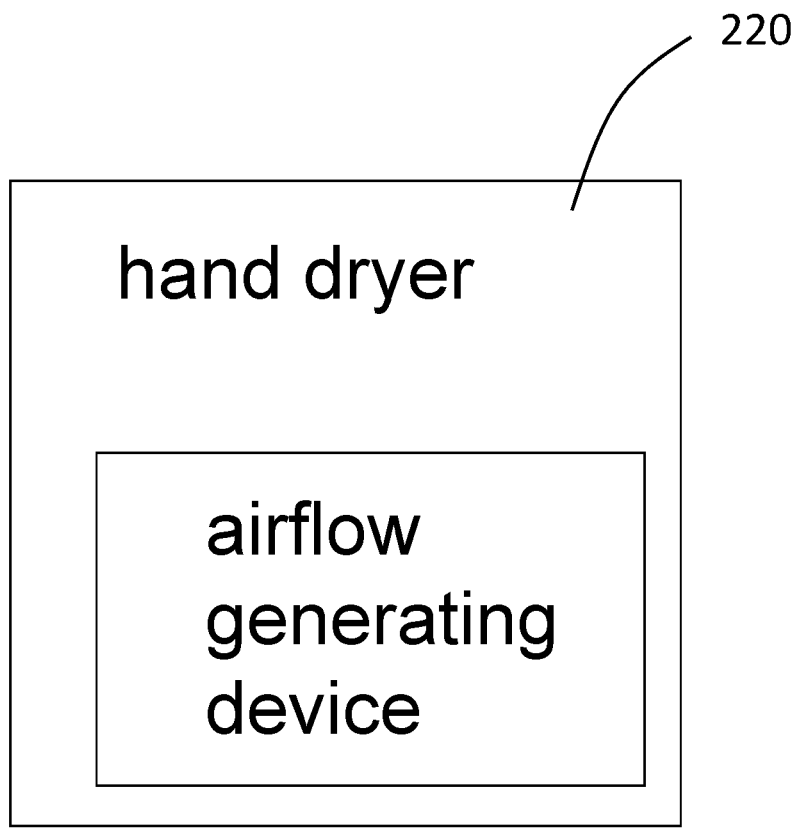
FIG. 23 illustrates the fluid generating device of the present invention which is utilized in a hand dryer.

FIG. 23 illustrates a hand dryer 220 which includes the above described single phase motor or the above described fluid generating device. In this embodiment, the hand dryer 210 adopts known structures and therefore is not described herein in further detail.

Figure 24:
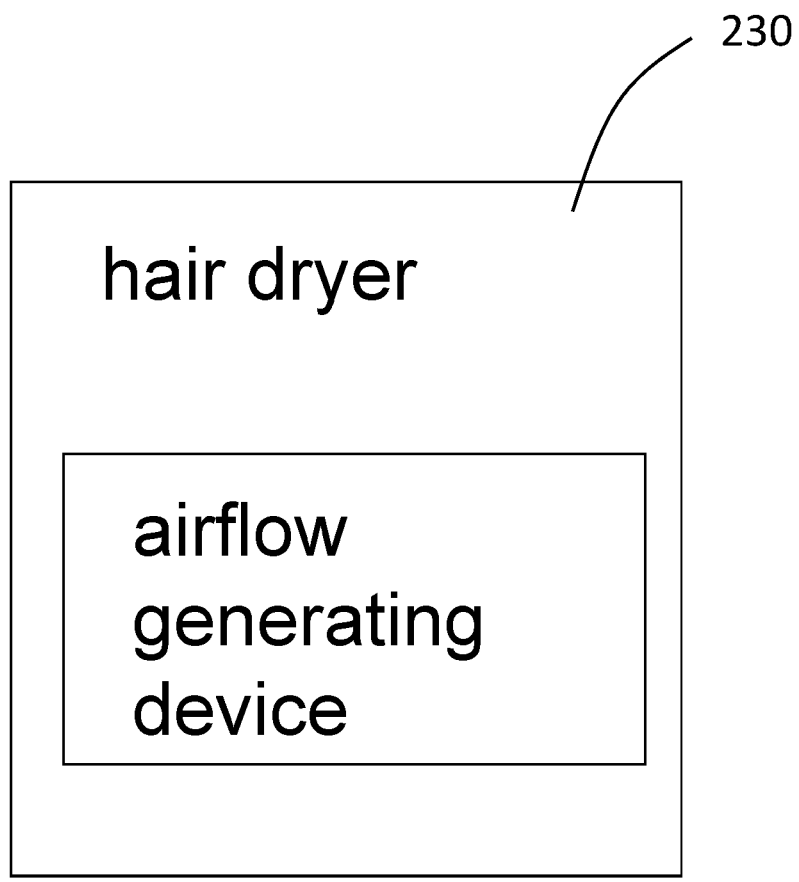
FIG. 24 illustrates the fluid generating device of the present invention which is utilized in a hair dryer.

FIG. 24 illustrates a hair dryer 230 which includes the above described single phase motor or the above described fluid generating device. In this embodiment, the hair dryer 230 adopts known structures and therefore is not described herein in further detail.

Figure 25:
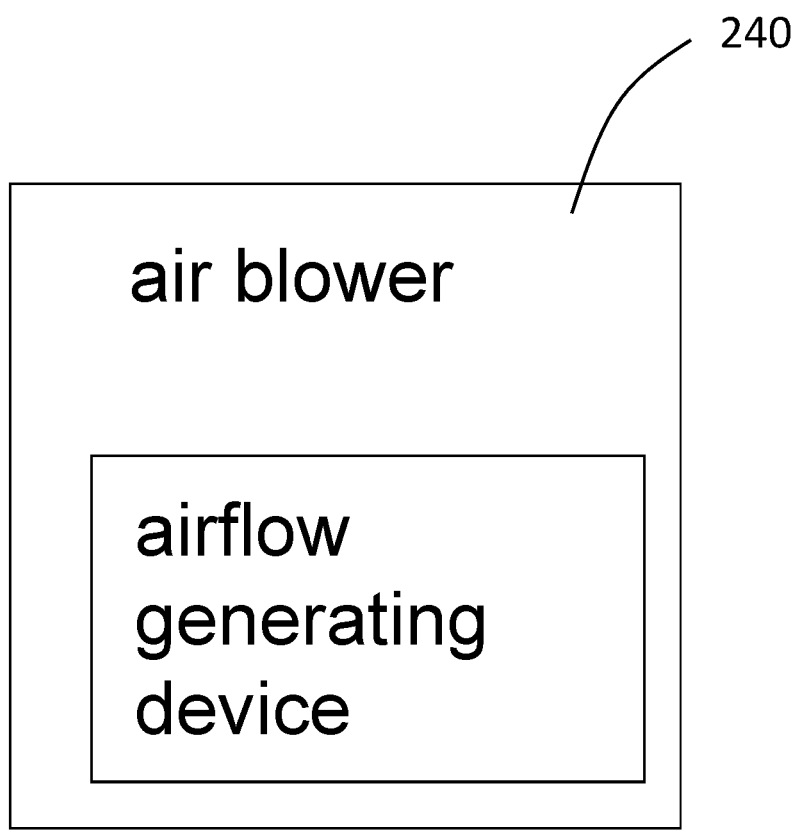
FIG. 25 illustrates the fluid generating device of the present invention which is utilized in an air blower.

FIG. 25 illustrates an air blower 240 which includes the above described single phase motor or the above described fluid generating device. In this embodiment, the air blower 240 adopts known structures and therefore is not described herein in further detail.

Although the invention is described with reference to one or more preferred embodiments, it should be appreciated by those skilled in the art that various modifications are possible. For example, the single phase motor may also be a permanent magnet synchronous motor in other embodiments. Therefore, the scope of the invention is to be determined by reference to the claims that follow.

The invention claimed is:

1. A fluid generating device comprising:
   a single phase motor comprising:
      a stator comprising a stator core and a stator winding wound around the stator core, the stator core comprising a yoke, a plurality of teeth extending inwardly from the yoke, a pole face formed at a distal end of each of the teeth and extending along a circumferential direction of the motor;
      a rotor rotatable relative to the stator, the rotor being received in a receiving chamber surrounded by the pole faces, the rotor comprising a plurality of magnetic poles confronting the pole faces of the stator, outer surfaces of the magnetic poles of the rotor and the pole faces of the stator being coaxial with each other to thereby form there between a substantially even air gap; and
      an impeller being driven by the rotor to generate a fluid flow;
   wherein circumferential ends of each pole face form a left cutting surface and a right cutting surface, the right cutting surface of one tooth and the left cutting surface of adjacent teeth form a slot opening, a distance between the left cutting surface and the right cutting surface forming the slot opening is 0.09 to 0.13 times an outer diameter of the rotor.

2. The fluid generating device of claim 1, wherein each tooth comprises a tooth body extending from the yoke and a pair of pole shoes extending respectively from a distal end of the tooth body in two opposite circumferential directions of the rotor.

3. The fluid generating device of claim 2, wherein the pole shoe has a radial thickness gradually decreasing in a direction away from the tooth body.

4. The fluid generating device of claim 2, wherein the slot opening is offset from a symmetrical center between the two adjacent teeth bodies.

5. The fluid generating device of claim 4, wherein the two pole shoes comprise a shorter pole shoe and a longer pole shoe, and only the inner surface of the shorter pole shoe forms a chamfer adjacent the slot opening.

6. The fluid generating device of claim 4, wherein the slot opening is offset from a symmetrical center of corresponding two adjacent teeth by an electric angle of 45 to 135 degrees.

7. The fluid generating device of claim 1, wherein the stator core is formed by joining a plurality of stator core units along a circumferential direction of the stator, each of the stator core units comprises a tooth with its pole shoe, and a yoke segment connected to the tooth, and the yoke segments of the adjacent stator core units are connected together to form the yoke of the stator core.

8. The fluid generating device of claim 7, wherein for each of the stator core units, one end of the tooth is connected to one end of the yoke segment or connected to the yoke segment between two ends of the yoke segment.

9. The fluid generating device of claim 1, wherein the teeth includes a first tooth and a second tooth, the pole face of the first tooth forms a first arc surface with a first positioning groove defined therein, the pole face of the second tooth forms a second arc surface with a second positioning groove defined thereon, and the first arc surface and the second arc surface are opposed to each other with the receiving chamber formed there between.

10. The fluid generating device of claim 9, wherein the first tooth and the second tooth form there between a first slot opening and a second slot opening at opposite sides of the rotor, and the first slot opening and the second slot opening are symmetrical about an axis of the rotor.

11. The fluid generating device of claim 10, wherein an angle of 60 to 65 degrees is formed between a connecting line connecting a center of the first slot opening and a center of the rotor and an extension direction of the tooth body of the first tooth.

12. The fluid generating device of claim 9, wherein a line connecting the first positioning groove and the second positioning groove coincides with center lines of the tooth bodies of the first tooth and the second tooth.

13. The fluid generating device of claim 12, wherein a depth of the first positioning groove into the first tooth and a depth of the second positioning groove into the second tooth are both 0.015 to 0.035 times the outer diameter of the rotor.

14. The fluid generating device of claim 12, wherein the slot opening has a width less than or equal to fourth times of a thickness of the air gap.

15. The fluid generating device of claim 1, wherein the single phase motor is a single phase permanent magnet direct current brushless motor or a single phase permanent magnet brushless synchronous motor.

16. An electric apparatus comprising a fluid generating device of claim 1.

17. The electric apparatus of claim 16, wherein the electric apparatus is a hand dryer, a hair dryer, a vacuum cleaner or an air blower.

18. The fluid generating device of claim 1, wherein the rotor comprises a rotary shaft and a permanent magnet fixed to the rotary shaft, a thickness of the permanent magnet is 0.4 to 0.48 times an outer diameter of the rotor.

19. The fluid generating device of claim 18, wherein a thickness of the substantially even air gap is 0.26 to 0.34 times the thickness of the permanent magnet.

\* \* \* \* \*